(12) United States Patent
Morimoto et al.

(10) Patent No.: US 10,210,264 B2
(45) Date of Patent: Feb. 19, 2019

(54) VEHICLE-REPAIR SUPPORT SYSTEM, SERVER, AND COMPUTER PROGRAM

(71) Applicant: DENSO CORPORATION, Kariya, Aichi-pref. (JP)

(72) Inventors: Hiroaki Morimoto, Kariya (JP); Masakazu Yamada, Kariya (JP); Naoki Muramatsu, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 552 days.

(21) Appl. No.: 14/785,254

(22) PCT Filed: Apr. 15, 2014

(86) PCT No.: PCT/JP2014/002115
§ 371 (c)(1),
(2) Date: Oct. 16, 2015

(87) PCT Pub. No.: WO2014/174791
PCT Pub. Date: Oct. 30, 2014

(65) Prior Publication Data
US 2016/0085864 A1 Mar. 24, 2016

(30) Foreign Application Priority Data

Apr. 22, 2013 (JP) .................................. 2013-089665
Jul. 24, 2013 (JP) .................................. 2013-153535

(51) Int. Cl.
*G06F 17/30* (2006.01)
*G06Q 10/00* (2012.01)

(52) U.S. Cl.
CPC .. *G06F 17/30867* (2013.01); *G06F 17/30528* (2013.01); *G06Q 10/20* (2013.01)

(58) Field of Classification Search
CPC ......... G06F 17/30011; G06F 17/30489; G06F 17/30371; G06F 17/30876;
(Continued)

(56) References Cited

U.S. PATENT DOCUMENTS 5,377,098 A * 12/1994 Sakai ........................ B60S 5/00
705/29
5,491,631 A * 2/1996 Shirane ................... F02D 41/22
123/479
(Continued)

FOREIGN PATENT DOCUMENTS

JP    H05165853 A    7/1993
JP    H10197285 A    7/1998
(Continued)

OTHER PUBLICATIONS

International Search Report and Written Opinion (in Japanese with English Translation) for PCT/JP2014/002115, dated Jul. 8, 2014; ISA/JP.

*Primary Examiner* — Ashish Thomas
*Assistant Examiner* — Rezwanul Mahmood
(74) *Attorney, Agent, or Firm* — Harness, Dickey & Pierce, P.L.C.

(57) ABSTRACT

A vehicle-repair support system including a communication terminal and a server is provided. The communication terminal obtains vehicle information from a vehicle. The server receives vehicle information from the communication terminal and supports repair of the vehicle. The server comprises an inquiry unit, a search unit and a search result notification unit. The inquiry unit makes an inquiry to a repair requester about a vehicle condition. Based on a result of the inquiry made by the inquiry unit, the search unit makes a search for information about similar cases which involve a symptom similar to a symptom of the vehicle (Continued)

targeted for the repair. The search result notification unit notifies a result of the search made by the search unit to the communication terminal.

18 Claims, 38 Drawing Sheets

(58) Field of Classification Search
CPC ......... G06F 17/30528; G06F 17/30861; G06F 17/30864; G06F 17/30867
See application file for complete search history.

(56) References Cited

U.S. PATENT DOCUMENTS

| | | | |
|---|---|---|---|
| 5,596,712 A | 1/1997 | Tsuyama et al. | |
| 7,693,720 B2* | 4/2010 | Kennewick | G06F 17/30654 704/257 |
| 7,970,527 B2* | 6/2011 | Nishi | F02N 11/10 340/438 |
| 9,317,983 B2* | 4/2016 | Ricci | H04W 4/21 |
| 2003/0225790 A1 | 12/2003 | Inoue | |
| 2004/0133319 A1* | 7/2004 | Pillar | A62C 27/00 701/31.4 |
| 2007/0179691 A1* | 8/2007 | Grenn | B60W 50/029 701/31.4 |
| 2007/0260363 A1* | 11/2007 | Miller | G07C 5/008 701/2 |
| 2008/0250095 A1* | 10/2008 | Mizuno | G06F 17/30861 709/201 |
| 2009/0281695 A1* | 11/2009 | Wilson | B60W 40/12 701/54 |
| 2009/0300065 A1* | 12/2009 | Birchall | G06Q 10/10 707/999.107 |
| 2010/0312369 A1* | 12/2010 | Dollar, Jr. | G06F 17/30749 700/94 |
| 2011/0087505 A1* | 4/2011 | Terlep | G06Q 40/08 705/4 |
| 2011/0238647 A1* | 9/2011 | Ingram | G08G 1/20 707/706 |
| 2011/0313951 A1* | 12/2011 | Cook | G06Q 10/04 705/400 |
| 2012/0054480 A1* | 3/2012 | Katayama | H04N 5/775 713/2 |
| 2012/0102322 A1* | 4/2012 | O'Brien | H04L 9/3271 713/168 |
| 2012/0113773 A1 | 5/2012 | Matsuo et al. | |
| 2012/0215398 A1 | 8/2012 | Chen et al. | |
| 2012/0253548 A1* | 10/2012 | Davidson | G06Q 10/08 701/1 |
| 2013/0013176 A1* | 1/2013 | Bassindale | F02N 11/0803 701/113 |
| 2013/0304276 A1* | 11/2013 | Flies | G06F 17/00 701/1 |
| 2013/0332004 A1* | 12/2013 | Gompert | G07C 5/008 701/1 |
| 2013/0332024 A1* | 12/2013 | Garrett | G07C 5/008 701/29.4 |
| 2014/0051489 A1* | 2/2014 | Pierucci | A63F 13/803 463/6 |
| 2014/0303808 A1* | 10/2014 | Sargent | G07C 5/00 701/1 |
| 2014/0306799 A1* | 10/2014 | Ricci | H04W 4/21 340/5.83 |
| 2014/0306826 A1* | 10/2014 | Ricci | H04W 4/21 340/573.1 |
| 2014/0324250 A1* | 10/2014 | Tomita | B60R 25/24 701/2 |
| 2015/0140991 A1* | 5/2015 | Silver | H04M 1/72577 455/418 |
| 2015/0165993 A1* | 6/2015 | Schaeffer | B60R 16/033 307/10.6 |
| 2016/0047320 A1* | 2/2016 | Bassindale | F02N 11/0803 701/113 |
| 2016/0085864 A1* | 3/2016 | Morimoto | G06Q 10/20 707/769 |
| 2016/0232635 A1* | 8/2016 | Saksonov | G06Q 50/22 |
| 2017/0337633 A1* | 11/2017 | Cook | G06Q 10/04 |
| 2018/0065637 A1* | 3/2018 | Bassindale | F02N 11/0803 |

FOREIGN PATENT DOCUMENTS

| | | |
|---|---|---|
| JP | H10253389 A | 9/1998 |
| JP | 2003015877 A | 1/2003 |
| JP | 2003114943 A | 4/2003 |
| JP | 2003132168 A | 5/2003 |
| JP | 2004005169 A | 1/2004 |
| JP | 2005-174037 A | 6/2005 |
| JP | 2006182319 A | 7/2006 |
| JP | 2012-103911 A | 5/2012 |

* cited by examiner

FIG. 12

| PRODUCT CATEGORY | SYMPTOM |
|---|---|
| GASOLINE ENGINE ▼ | ABNORMAL IDLING ▼ |

SYMPTOM DETAILS

UNSTABLE IDLING SPEED ▼

1. TROUBLE OUTLINE
   - DATE/TIME [ ▼ ]/[ ▼ ]/[ ▼ ]
   - FREQUENCY  ⦿ALWAYS  ○ONLY ONCE  ○OCCASIONALLY
   - [    ] TIMES

2. CIRCUMSTANCES
   - WEATHER  ○FINE  ○CLOUDY  ○RAIN  ○SNOW  ⦿IRRELEVANT  ○OTHER
   - [                                                        ]
   - TEMPERATURE  [    ] °C

3. RELEVANT CONDITIONS
   - SINCE WHEN?  [    ] DAYS AGO  [    ] WEEKS AGO  [ 3 ] MONTHS AGO
   - INITIAL OCCURRENCE  ○AFTER REPAIR  ○AFTER WASH  ○AFTER ACCESSORY MOUNTING  ⦿NOT KNOWN
   - VEHICLE CONDITION  ○STOPPED  ○AFTER WASH  ⦿TRAVELING  ○IRRELEVANT
   - DRIVING CONDITION  ○CONSTANT SPEED  ⦿ACCELERATING  ○DECELERATING
   - VEHICLE SPEED  [    ] Km
   - SHIFT LEVER POSITION  ○P  ○R  ○N  ⦿D  ○2  ○M
   - ENGINE TEMPERATURE  ○COLD  ⦿WARM  ○IRRELEVANT
   - ROAD SURFACE  ○SLOPED  ○PAVED  ○UNPAVED  ○CONDITION  ⦿IRRELEVANT  ○OTHER
   - GRADIENT  ○FLAT  ○ASCENDING  ○DESCENDING  ⦿IRRELEVANT
   - OTHER THAN ABOVE  [                                    ]

FIG. 21

SIMILAR CASE LIST SCREEN

■ DIAGNOSTIC SERVICE
FUNCTION TOOL HELP

[START]

SEARCH CONDITIONS

| VEHICLE MAKER | ○○○ |
| --- | --- |
| VEHICLE NAME | VEHICLE A |
| VEHICLE TYPE | RA2 |
| PRODUCT CATEGORY | ALL |
| DIAG. CODE | |
| KEYWORD | PPP12-XXXX |
| ENGINE TYPE | ABNORMAL IDLING |
| SYMPTOM | IDLING SPEED |
| SYMPTOM DETAILS | OCCASIONAL |
| FREQUENCY | ALL |
| FAILURE CAUSE | ALL |
| REMEDY | |

[SEARCH]

REPAIR SUPPORT  — 111

20XX/XX/XX  [MENU]

SIMILAR-CASE SEARCH RESULT LIST

| MAKER | VEHICLE NAME | VEHICLE TYPE | DIAG. CODE | OUTLINE |
| --- | --- | --- | --- | --- |
| ○○○ | VEHICLE A | RA2 | P0201 | ENGINE IDLING ABNORMAL DUE TO INJECTOR TROUBLE |
| ○○○ | VEHICLE A | RA2 | P0102 | ABNORMAL IDLING DUE TO BROKEN AIR DUCT |
| ○○○ | VEHICLE A | RA2 | NONE | ABNORMAL IDLING DUE TO IGNITION COIL FAILURE |
| ○○○ | … | … | … | … |
| … | … | … | … | … |
| … | … | … | … | … |

MAIN-CAUSE PARTS

| MAIN-CAUSE PARTS | FREQUENCY |
| --- | --- |
| ENGINE ECU REPLACED | HIGH |
| THROTTLE BODY REPLACED | MEDIUM |
| THROTTLE BODY CLEANED | LOW |
| HARNESS CORRECTED | LOW |

202 — [PROJECT]

FIG. 22

SIMILAR CASE DETAILS SCREEN

■ DIAGNOSTIC SERVICE
FUNCTION TOOL HELP

20XX/XX/XX  [MENU]

REPAIR SUPPORT

GASOLINE ENGINE    SIMILAR CASE — 112

| | |
|---|---|
| SUBJECT: | ABNORMAL ENGINE IDLING DUE TO INJECTOR TROUBLE |
| MAKER: | OOO |
| VEHICLE NAME: | VEHICLE A |
| REGISTRATION DATE: | 2002/09/11 |
| VEHICLE TYPE: | RA2 |
| ENGINE TYPE: | PPP12-XXXX |
| OCCURRENCE FREQUENCY: | OCCASIONAL |
| SYMPTOM: | ABNORMAL IDLING |
| DETAILED SYMPTOM: | 7. UNSTABLE IDLING SPEED |
| DIAG. CODE: | P0201: INJECTOR #1 SYSTEM, P0204: INJECTOR #4 SYSTEM |
| SYMPTOM (CONDITION): | ENGINE IDLING OCCASIONALLY BECOMES ROUGH. NO ABNORMALITY WHEN IDLING IS FINISHED. SOMETIMES, ROUGH IDLING ENDS IN AN ENGINE STALL. |
| RESULTS (FINDING): | BASED ON DIAG. CODES, INJECTOR FAILURE WAS SUSPECTED. AS A RESULT OF POWER BALANCE CHECK, CYLINDERS #1 AND #4 WERE ASSUMED DEFECTIVE. AS CONNECTING AND DISCONNECTING INJECTORS CAUSED DIAG. CODE DETECTION ON CYLINDERS #1 AND #4, INJECTORS FOR BOTH CYLINDERS WERE DETERMINED DEFECTIVE. |
| REMEDY: | INJECTORS WERE REPLACED. SUBSEQUENTLY, NO TROUBLE. |
| MAIN PARTS REPLACED: | INJECTORS |

[START]    [PROJECT]

FIG. 24
DIAGNOSTIC REPORT
REGISTRATION NO.: MIKAWA 330NA55XX
VEHICLE NAME: VEHICLE A
MILEAGE: 17,969 KM
○○ SERVICE, ○○ STORE
○○○, KARIYA CITY, AICHI PREFECTURE
0561-XX-XXXX
INSPECTION RESULTS
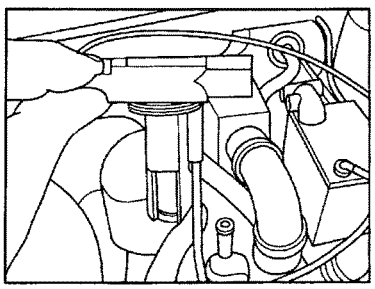
INJECTORS INSPECTED BASED ON DIAG. CODES.
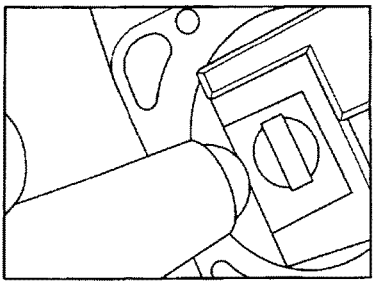
AS CONNECTING AND DISCONNECTING INJECTORS CAUSED DIAG. CODE DETECTION ON CYLINDERS #1 AND #4, BOTH WERE DETERMINED DEFECTIVE.
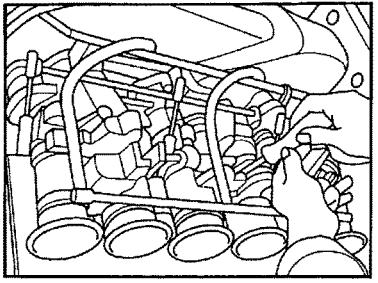
(FOR REFERENCE) REPAIR SCENE
—201

FIG. 27

INQUIRY SCREEN
■ DIAGNOSTIC SERVICE
FUNCTION TOOL HELP

REPAIR SUPPORT   20xx/xx/xx   MENU

REPAIR INFO INPUT | INQUIRY | ALL DIAGNOSIS | SIMILAR CASE SEARCH | INVESTIGATION RESULT INPUT | REPORT PREPARATION

- CLIENT NAME
- VEHICLE INFO
  CHASSIS NO.
  MAKER
  VEHICLE NAME
  [DETAILS]
- VEHICLE ACCEPTANCE INFO
  DATE ACCEPTED  Y▼ M▼ D▼
  PERSON IN CHARGE ▼
  MILEAGE  km
- INQUIRY
  REASON FOR      IS REPAIR ATTRIBUTABLE TO ACCIDENT/DISASTER?
  REPAIR — 121a    YES   NO — 121b
  PRODUCT                      ▼ — 121d
  CATEGORY
           121c              [ENTER]

START                                    PROJECT

INQUIRY SCREEN

■ DIAGNOSTIC SERVICE
FUNCTION TOOL HELP

REPAIR SUPPORT

20XX/XX/XX  [MENU]

[RETURN]

REPAIR INFO INPUT

| INQUIRY | ALL DIAGNOSIS | SIMILAR CASE SEARCH | INVESTIGATION RESULT INPUT | REPORT PREPARATION |

☑ CLIENT NAME

☑ VEHICLE INFO
CHASSIS NO.
MAKER
VEHICLE NAME
[DETAILS]

☑ VEHICLE ACCEPTANCE INFO
DATE ACCEPTED  Y▸ M▸ D▸
PERSON IN CHARGE ▸
MILEAGE ___ km

☑ INQUIRY
REASON FOR REPAIR — 121a

IS REPAIR ATTRIBUTABLE TO ACCIDENT/DISASTER?
YES  NO — 121b

PRODUCT CATEGORY — 121c
GASOLINE ENGINE — 121d
DIESEL ENGINE
BATTERY/CHARGER
TRANSMISSION
CHASSIS
BODY
AIR-CONDITIONER
INFO/AV DEVICE
OTHER

[ENTER]

[START]       [PROJECT]

INQUIRY SCREEN

■ DIAGNOSTIC SERVICE
FUNCTION TOOL HELP

START

REPAIR SUPPORT — 121

20XX/XX/XX  [RETURN] [MENU]

| REPAIR INFO INPUT |

| INQUIRY | ALL DIAGNOSIS | SIMILAR CASE SEARCH | INVESTIGATION RESULT INPUT | REPORT PREPARATION |

☑ CLIENT NAME

☑ VEHICLE INFO
CHASSIS NO.
MAKER
VEHICLE NAME
[DETAILS]

☑ VEHICLE ACCEPTANCE INFO
DATE ACCEPTED  [Y▼] [M▼] [D▼]
PERSON IN CHARGE  [▼]
MILEAGE  [    ] km

☑ INQUIRY
REASON FOR REPAIR — 121a  IS REPAIR ATTRIBUTABLE TO ACCIDENT/DISASTER? [YES] [NO] — 121b
PRODUCT CATEGORY — 121c  [GASOLINE ENGINE ▼] — 121d
MAIN SYMPTOM  [▼] — 121f
* WHEN THERE ARE MORE SYMPTOMS, ENTER THEM IN THE "OTHER SYMPTOMS" AND "OTHER SYMPTOM DETAILS" FIELDS.
OTHER SYMPTOMS  [▼]
— 121e

[ENTER]

[PROJECT]

FIG. 30

INQUIRY SCREEN

■ DIAGNOSTIC SERVICE
FUNCTION TOOL HELP

START

REPAIR SUPPORT                                    20XX/XX/XX    [MENU]

[RETURN]

| INQUIRY | ALL DIAGNOSIS | SIMILAR CASE SEARCH | INVESTIGATION RESULT INPUT | REPORT PREPARATION |

REPAIR INFO INPUT

☐ VEHICLE INFO
CHASSIS NO.
MAKER
VEHICLE NAME
[DETAILS]

☐ VEHICLE ACCEPTANCE INFO
DATE ACCEPTED   Y▼  M▼  D▼
PERSON IN CHARGE
MILEAGE                        km

☐ INQUIRY
REASON FOR     IS REPAIR ATTRIBUTABLE TO ACCIDENT/DISASTER?
REPAIR       121a— YES   NO  —121b
PRODUCT      121c— GASOLINE ENGINE ▼
CATEGORY
MAIN SYMPTOM     START-UP TROUBLE/FAILURE ▼ —121d
                 ┌──────────────────────────┐ —121f
                 │ START-UP TROUBLE/FAILURE │
                 │ ABNORMAL IDLING          │
                 │ ENGINE STALL             │
                 │ ACCELERATION TROUBLE     │
           121e  │ OVERHEAT                 │
                 │ ABNORMAL SOUND           │
                 │ ONLY CHECK ENGINE LAMP LIGHTS. │
                 │ OTHER                    │
                 └──────────────────────────┘
* WHEN THERE ARE MORE SYMPTOMS" AND "OTHER SYMPTOM DETAILS" FIELDS.

[ENTER]

PROJECT

INQUIRY SCREEN

FIG. 32

INQUIRY SCREEN

FIG. 34

SIMILAR CASE SEARCH SCREEN

FIG. 35

SIMILAR CASE SEARCH SCREEN

■ DIAGNOSTIC SERVICE
FUNCTION TOOL HELP

| REPAIR INFO INPUT | | REPAIR SUPPORT | | 20XX/XX/XX [RETURN] |

| INQUIRY | ALL DIAGNOSIS | SIMILAR CASE SEARCH | INVESTIGATION RESULT INPUT | REPORT PREPARATION |

☐ SEARCH CONDITIONS   TO EXCLUDE FROM SEARCH CONDITIONS, CANCEL CHECKING.

[SEARCH]  ☑ ADDITIONAL KEYWORD

☐ SEARCH RESULTS   25 DOCUMENTS WERE FOUND. RESULTS CAN BE NARROWED DOWN BY ADDING KEYWORDS.

| INITIAL REGISTRATION | VEHICLE NAME | MAIN-CAUSE PART | SYMPTOM | SYMPTOM DETAILS |
|---|---|---|---|---|
| JULY 2007 | | FUEL PUMP (LOW PRESSURE) | START-UP TROUBLE/FAILURE | INITIAL EXPLOSION DOES NOT OCCUR. |
| JULY 2007 | | FUEL PRESSURE SENSOR | | |
| MAY 2007 | | O$_2$ SENSOR | ENGINE STALL | ENGINE STALL |
| MAY 2007 | | ENGINE COMPUTER | ENGINE STALL | START-UP TROUBLE/FAILURE | INITIAL EXPLOSION DOES NOT OCCUR. |
| MAY 2007 | | O$_2$ SENSOR | ABNORMAL IDLING | UNSTABLE IDLING SPEED |
| APRIL 2007 | | O$_2$ SENSOR | | |

GASPING/LIMPING DURING ACCELERATION

ACCELERATION TROUBLE

| 4 | NONE |
| 5 | IDLING ROTATION CONTROL VALVE |

☐ POSSIBLE FAULTY PARTS

| 1 | WIRE HARNESS CONNECTOR |
| 2 | O$_2$ SENSOR |
| 3 | IGNITION COIL (MAY BE INCLUDING IGNITER) |

[START]   [PROJECT]   [MENU]

REPORT PREPARATION SCREEN

■ DIAGNOSTIC SERVICE
FUNCTION TOOL HELP

REPAIR SUPPORT

20XX/XX/XX   [MENU]

[RETURN]

| REPAIR INFO INPUT | INQUIRY | ALL DIAGNOSIS | SIMILAR CASE SEARCH | INVESTIGATION RESULT INPUT | REPORT PREPARATION |

CANCEL CHECKING TO EXCLUDE FROM PRINTING.

☑ CLIENT NAME

☑ VEHICLE
  VEHICLE NAME
  REGISTRATION NO.
  INITIAL REGISTRATION YEAR/MONTH
  ENGINE TYPE
  CHASSIS NO.
  MILEAGE

☑ INQUIRY
  MAIN SYMPTOM    START-UP TROUBLE/FAILURE
  DETAILS         START-UP POSSIBLE BUT TAKES TIME
  OTHER SYMPTOMS  ABNORMAL SOUND
  DETAILS

TROUBLE CODES

| SYSTEM NAME | TROUBLE CODE | DESCRIPTION | STATUS |
|---|---|---|---|
| ☑ ENGINE | | | |
| ☑ D-SEAT MOTOR | | | |

INVESTIGATION CONTENTS

| STEP | INVESTIGATION RESULTS |
|---|---|
| ☑ STEP 1 | |

START        PROJECT

125

VEHICLE-REPAIR SUPPORT SYSTEM, SERVER, AND COMPUTER PROGRAM

CROSS REFERENCE TO RELATED APPLICATIONS

This application is a U.S. National Phase Application under 35 U.S.C. 371 of International Application No. PCT/JP2014/002115 filed on Apr. 15, 2014 and published in Japanese as WO 2014/174791 A1 on Oct. 30, 2014. This application is based on and claims the benefit of priority from Japanese Patent Applications No. 2013-089665 filed on Apr. 22, 2013 and No. 2013-153535 filed on Jul. 24, 2013. The entire disclosures of all of the above applications are incorporated herein by reference.

TECHNICAL FIELD

The present disclosure relates to a vehicle-repair support system including a communication terminal for obtaining vehicle information from a vehicle and a server for receiving vehicle information from the communication terminal to support vehicle repair, and to a server and a computer program.

BACKGROUND ART

A vehicle-repair support system in which a server and a communication terminal are linked to each other to support vehicle repair is disclosed (see, for example, patent literatures 1 and 2). In the disclosed configuration, to the communication terminal, the server transmits instructions to a worker (mechanic) for vehicle repair and the communication terminal displays the instructions to the worker received from the server.

PRIOR ART LITERATURES

Patent Literature

Patent Literature 1: JP H10-197285A
Patent Literature 2: JP 2003-132168A

SUMMARY OF INVENTION

In an existing vehicle-repair support system of the above type: a worker inquires of a repair requester about the condition of the vehicle and obtains diagnostic information from the vehicle; and, referring to a repair manual or guidebook based on the results of the inquiry and the diagnostic information, the worker carries out diagnosis and repair following a procedure described in such a repair manual or guidebook step by step. This approach is troublesome and increases burden on the worker. Also, when the worker inquires of the repair requester, it is possible depending on the technical level of the worker that required inquiry items are not completely applied. This can cause the worker to diagnose the vehicle applying unrequired inquiry items or without applying required inquiry items. As a result, there can be cases where the worker cannot repair the vehicle in an appropriate manner, for example, taking an unreasonable amount of time.

The present disclosure has been made in view of the above circumstances, and it is an object of the present disclosure to provide a vehicle-repair support system, a server, and a computer program that, while reducing the burden on a vehicle worker, enables the worker to appropriately repair a vehicle.

In a first example of the present disclosure, a vehicle-repair support system comprising a communication terminal and a server is provided. The communication terminal obtains vehicle information from a vehicle. The server receives the vehicle information from the communication terminal and supports repair of the vehicle. The server comprises an inquiry unit, a search unit and a search result notification unit. The inquiry unit makes an inquiry to a repair requester about a vehicle condition. Based on a result of the inquiry made by the inquiry unit, the search unit makes a search for information about similar cases which involve a symptom similar to a symptom of the vehicle targeted for the repair. The search result notification unit notifies a result of the search made by the search unit to the communication terminal.

Namely, the server inquires the repair requester about the condition of the vehicle, and then, based on the results of the inquiry, searches for information about similar cases which involved a symptom similar to the symptom of the vehicle targeted for the repair, and notifies the results of the search to the communication terminal. Thus, the worker can carry out repair referring to the information about similar cases notified from the server to the communication terminal. This reduces the burden on the worker to repair the vehicle and allows the worker to repair the vehicle in an appropriate manner.

In a second example of the present disclosure, a server which constitutes a vehicle-repair support system in cooperation with a communication terminal that obtains vehicle information from a vehicle and which receives the vehicle information from the communication terminal and supports repair of the vehicle is provided. The server comprises an inquiry unit, a search unit and a search result notification unit. The inquiry unit makes an inquiry to a repair requester about a vehicle condition. Based on a result of the inquiry made by the inquiry unit, the search unit makes a search for information about similar cases which involve a symptom similar to a symptom of the vehicle targeted for the repair. The search result notification unit notifies a result of the search made by the search unit to the communication terminal.

In a third example of the present disclosure, there is provided a computer program that causes a computer provided in a server, which constitutes a vehicle-repair support system in cooperation with a communication terminal that obtains vehicle information from a vehicle and which receives the vehicle information from the communication terminal to support repair of the vehicle, to execute: a first step of making an inquiry to a repair requester about vehicle condition; a second step of, based on a result of the inquiry made in the first step, making a search for information about similar cases which involve a symptom similar to a symptom of the vehicle targeted for the repair; and a third step of notifying the communication terminal of a result of the search made in the second step. The computer program may be stored in a non-transitory computer-readable storage medium.

BRIEF DESCRIPTION OF DRAWINGS

FIG. 12 illustrates inquiry contents.

FIG. 21 illustrates a similar case list screen.

FIG. 22 illustrates a similar case details screen.

FIG. 24 illustrates a diagnostic report printed on paper.

FIG. 27 illustrates a first inquiry screen according to a third embodiment.

FIG. 28 illustrates a second inquiry screen.

FIG. 29 illustrates a third inquiry screen.

FIG. 30 illustrates a fourth inquiry screen.

FIG. 31 illustrates a fifth inquiry screen.

FIG. 32 illustrates a six inquiry screen.

FIG. 34 illustrates a first similar case search screen.

FIG. 35 illustrates a second similar case search screen.

FIG. 37 illustrates a report preparation screen.

EMBODIMENTS FOR CARRYING OUT INVENTION

First Embodiment

Figure 1:
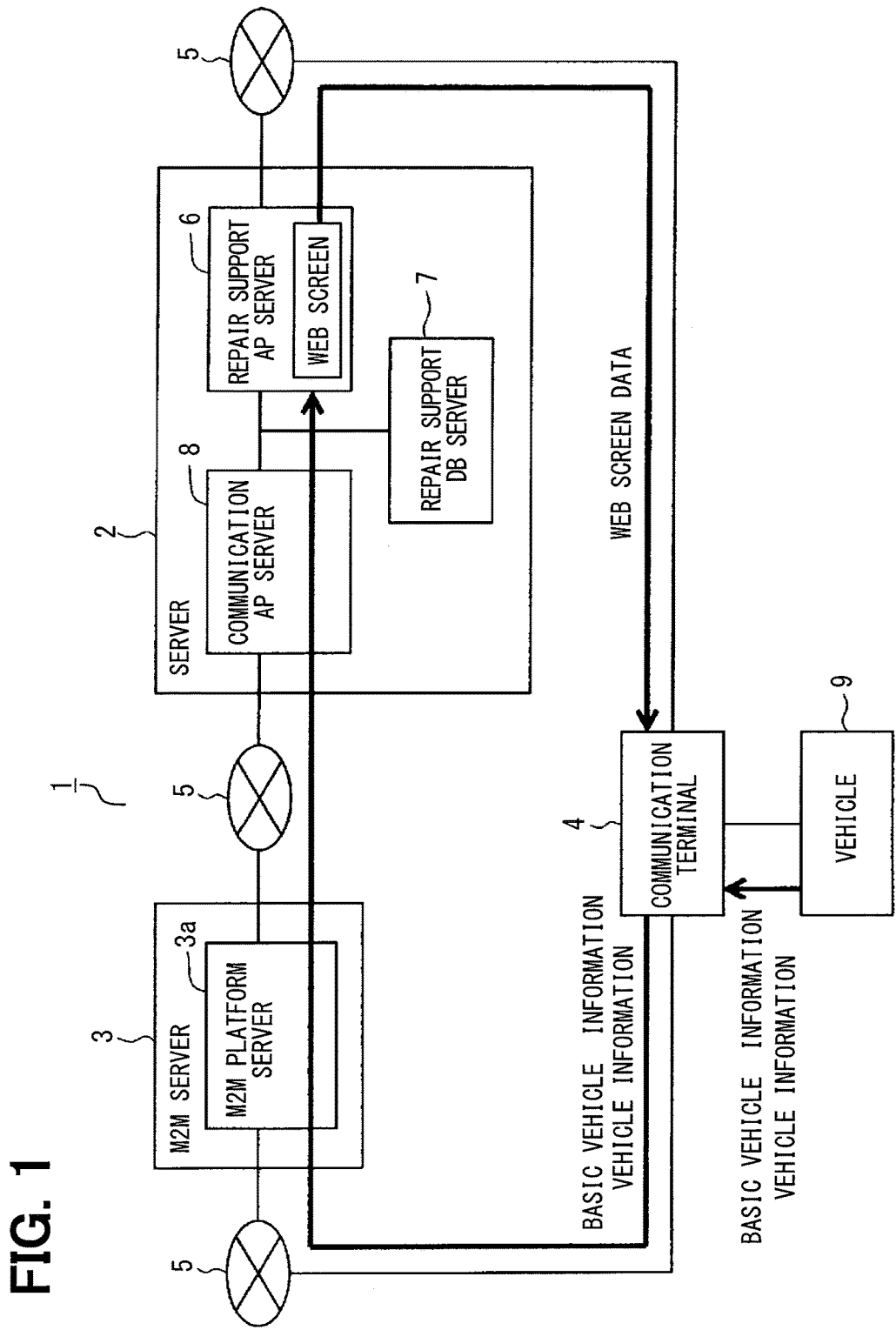
FIG. 1 is an outline configuration diagram illustrating a first embodiment.

A first embodiment will be described in the following with reference to FIGS. 1 to 25. A vehicle-repair support system 1 includes, as shown in FIG. 1, a server 2, an M2M (machine-to-machine) server 3, and a communication terminal 4, which are connectable via the Internet 5 (corresponding to a communication network).

The server 2 includes a repair support application (repair support AP) server 6, a repair support database (repair support DB) server 7 (corresponding to a storage unit), and a communication application (communication AP) server 8 on a functional basis. The repair support DB server 7 stores repair support information required for vehicle-repair support. The repair support AP server 6 reads out repair support information stored in the repair support DB server 7 and supports vehicle repair using the repair support information read out. The communication AP server 8 controls communication between the server 2 and the M2M server 3.

Figure 2:
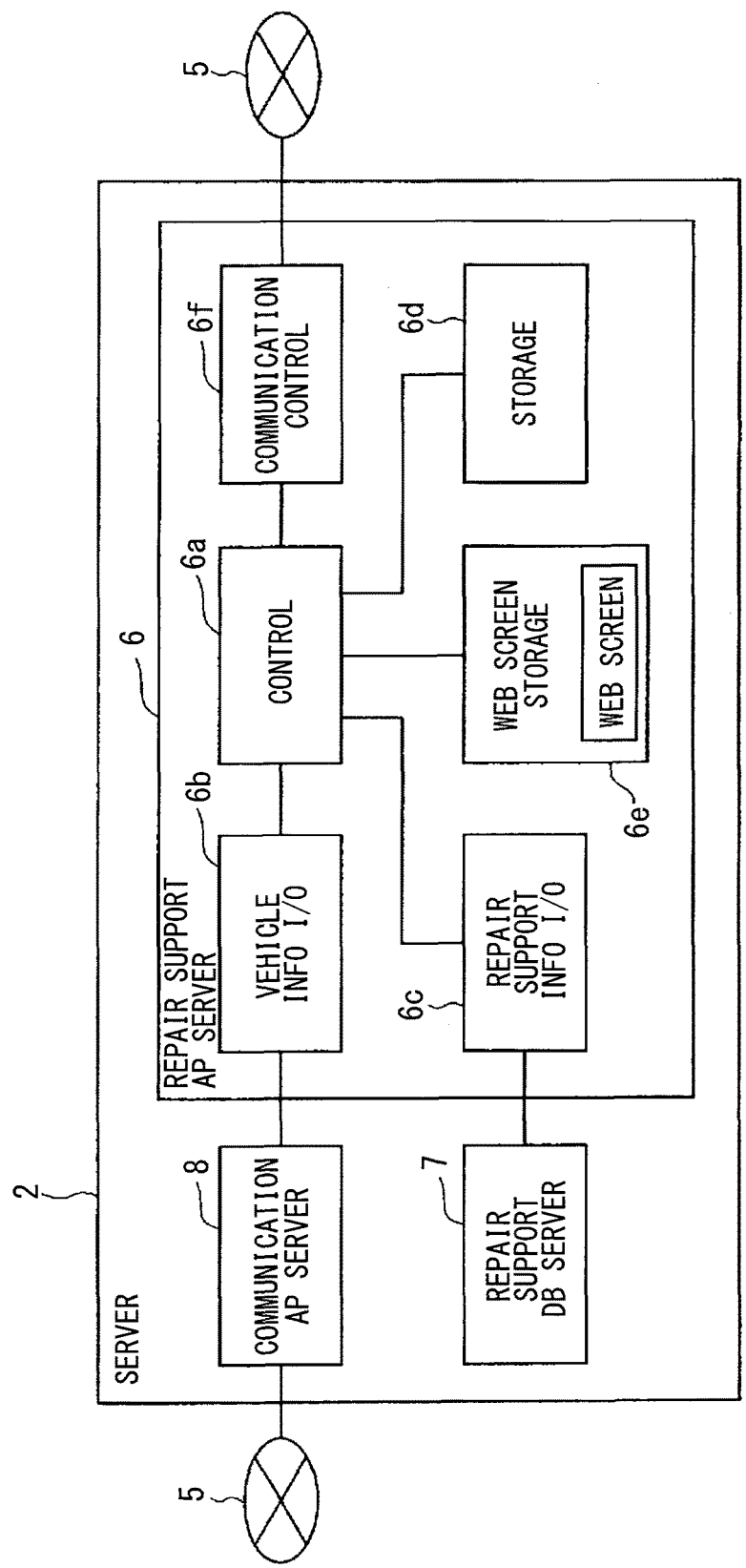
FIG. 2 is a functional block diagram illustrating a server configuration.

The repair support AP server 6 includes, as shown in FIG. 2, a controller 6a (corresponding to a computer), a vehicle information input/output unit 6b, a repair support information input/output unit 6c, a storage unit 6d, a WEB screen storage unit 6e, and a communication controller 6f. The controller 6a includes a microcomputer which includes, for example, a CPU (Central Processing Unit), a ROM (Read Only Memory), and a RAM (Random Access Memory). The controller 6a controls the overall operation of the repair support AP server 6 by executing, with the CPU, computer programs stored in the ROM.

The vehicle basic information and vehicle information (diagnostic information and operation data) to be described later received by the communication AP server 8 from the communication terminal 4 via the M2M server 3 is inputted to the vehicle information input/output unit 6b. The vehicle information input/output unit 6b outputs the vehicle basic information and vehicle information to the controller 6a. The repair support information input/output unit 6c receives repair support information stored in the repair support DB server 7 and outputs the received repair support information to the controller 6a. The storage unit 6d stores various data for the controller 6a to execute various kinds of data processing. The data stored in the storage unit 6d includes screen source data used to compose WEB screens.

The controller 6a reads screen source data stored in the storage unit 6d, generates a WEB screen using the screen source data read out, and stores the generated WEB screen in the WEB screen storage unit 6e. The WEB screen mentioned above refers to a screen which can be posted on the Internet using the WWW (World Wide Web) system. A WEB screen is composed of, for example, text data, layout information in HTML (Hyper Text Markup Language), and still images, sounds, and moving images built in documents.

Figure 3:
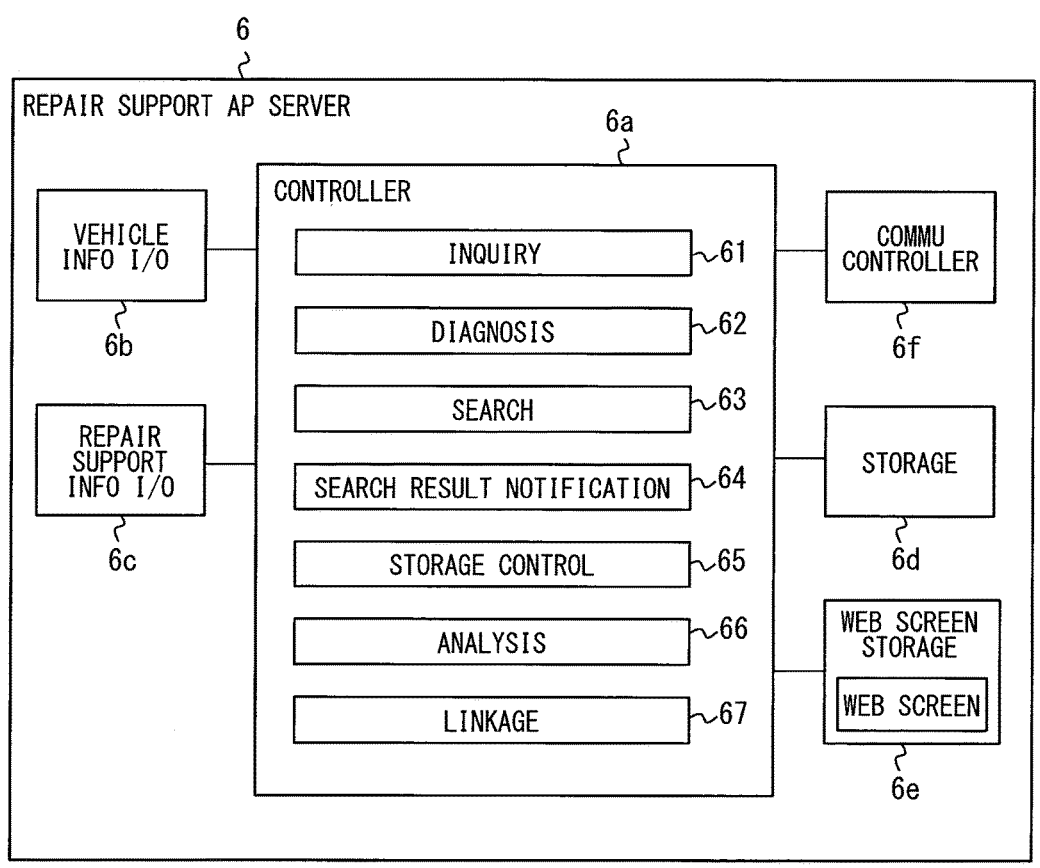
FIG. 3 is a functional block diagram illustrating a configuration of a repair support AP server.

The controller 6a includes, as shown in FIG. 3, an inquiry unit 61, a diagnosis unit 62, a search unit 63, a search result notification unit 64, a storage controller 65, an analysis unit 66, and a linkage unit 67 on a functional basis. The inquiry unit 61 has a function to inquire of a repair requester about the condition of the vehicle. The diagnosis unit 62 has a function to analyze vehicle information obtained from a vehicle 9 and diagnose the vehicle. The search unit 63 has a function to search for information about similar cases which involved a symptom similar to the symptom shown by the vehicle 9 to be repaired based on inquiry and diagnosis results. The search result notification unit 64 has a function to notify a search result to the communication terminal 4. The storage controller 65 has a function to store in the repair support DB server 7 information about inquiry results, diagnosis results and similar cases and information about parts considered main causes of troubles to be removed. The analysis unit 66 has a function to analyze the information about similar cases and the information about parts considered main causes of the trouble. The linkage unit 67 has a function for linkage with another vehicle-repair support system.

The communication controller 6f controls data communication between the repair support AP server 6 and the communication terminal 4, transmits WEB screen data to compose a WEB screen to the communication terminal 4, and receives operation signals transmitted from the communication terminal 4 as a worker operates the communication terminal 4. The controller 6a, when an operation signal transmitted from the communication terminal 4 is received via the communication controller 6 or when vehicle information transmitted from the communication terminal 4 is received via the vehicle information input/output unit 6b, selects, out of the WEB screens stored in the WEB screen storage unit 6e, a WEB screen to be provided to the worker (to be made displayable at the communication terminal 4 via the communication network 5) and makes preparations for transmitting the WEB screen data to compose the selected WEB screen. When a WEB screen is provided by the server 2, the WEB screen can be displayed at the communication terminal 4 via the Internet 5.

When the condition for transmitting the transmission-prepared WEB screen data is established, the controller 6a has the WEB screen data transmitted from the communication controller 6f to the communication terminal 4. When the WEB screen data is transmitted from the server 2 to the communication terminal 4 in this way, the WEB screen provided by the server 2 becomes displayable at the communication terminal 4 via the Internet 5. Namely, the WEB screen generated by the server 2 can be viewed by the worker at the communication terminal 4.

The M2M server 3 includes an M2M platform server 3a. The M2M server 3 is coupled to the server 2 via the Internet 5, and exchanges vehicle basic information and vehicle information with the server 2 via the Internet 5. The M2M server 3 is also coupled via the Internet 5 to another server (not shown) having a different function, for example, a function to manage vehicle basic information and vehicle information, and the M2M server 3 exchanges the vehicle basic information and vehicle information with such a server having the different function via the Internet 5.

Figure 4:
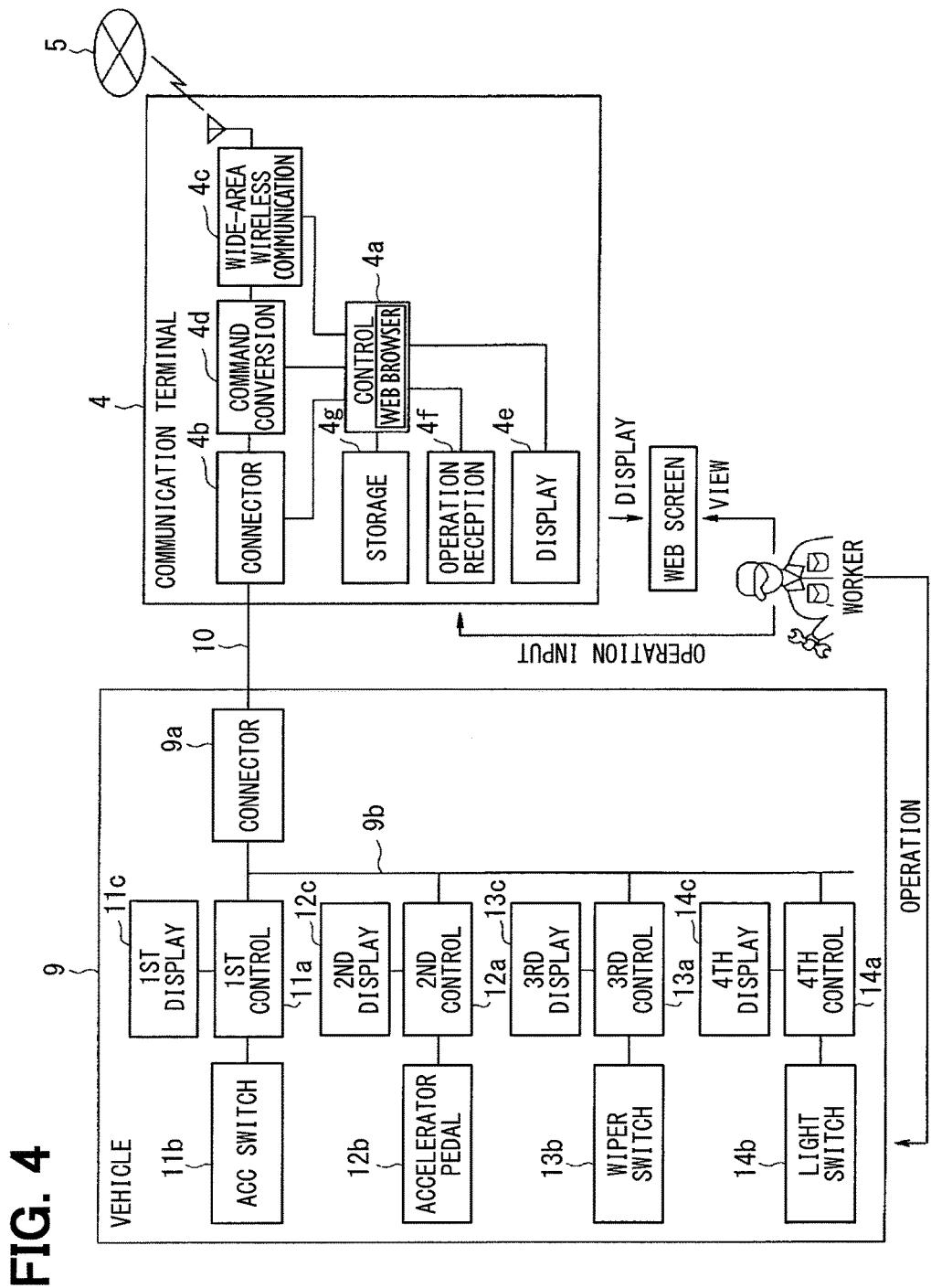
FIG. 4 is a functional block diagram illustrating configurations of a vehicle and a communication terminal.
Figure 5:
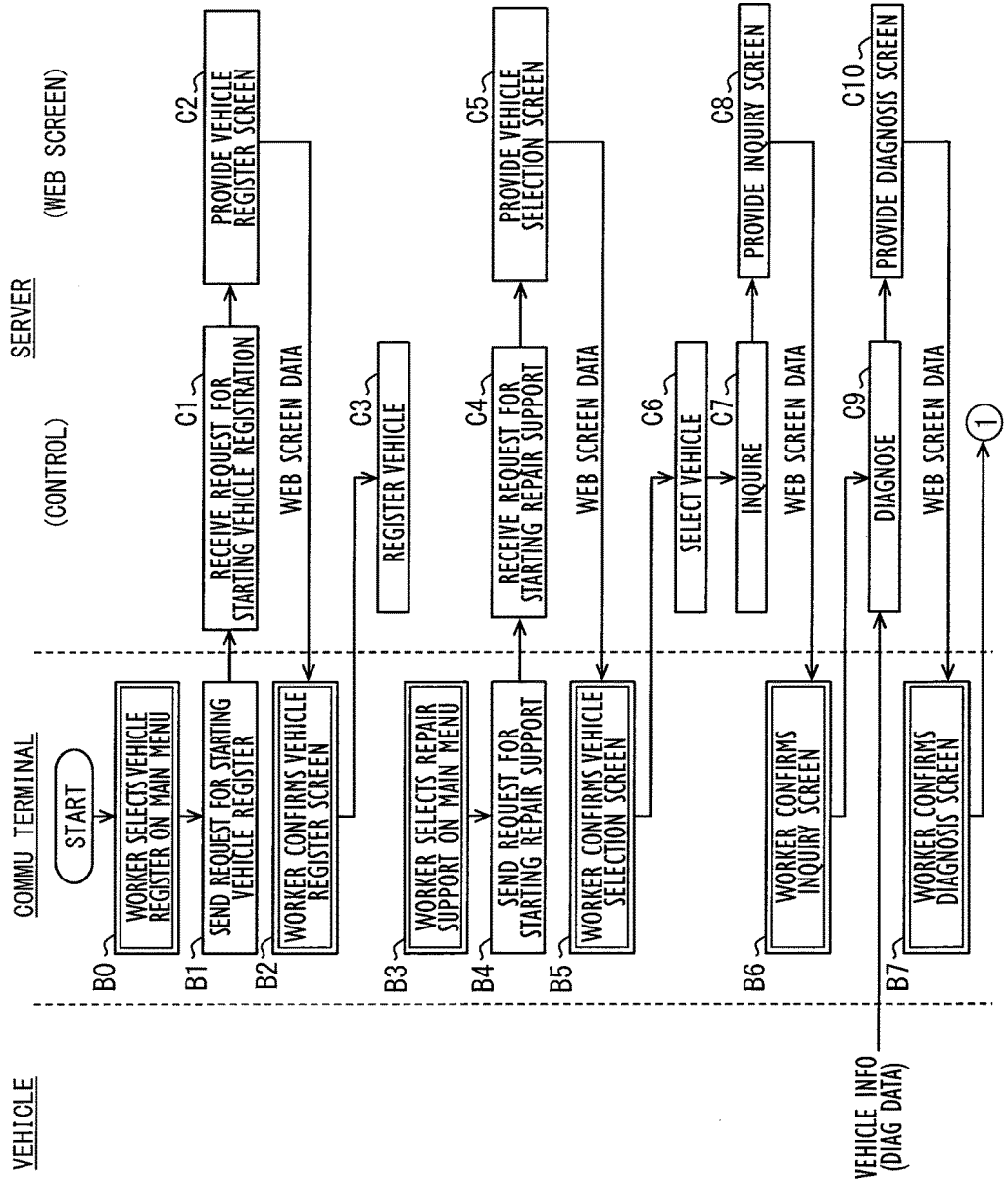
FIG. 5 is a first diagram illustrating a flow of processing in a vehicle repair support system.
Figure 6:
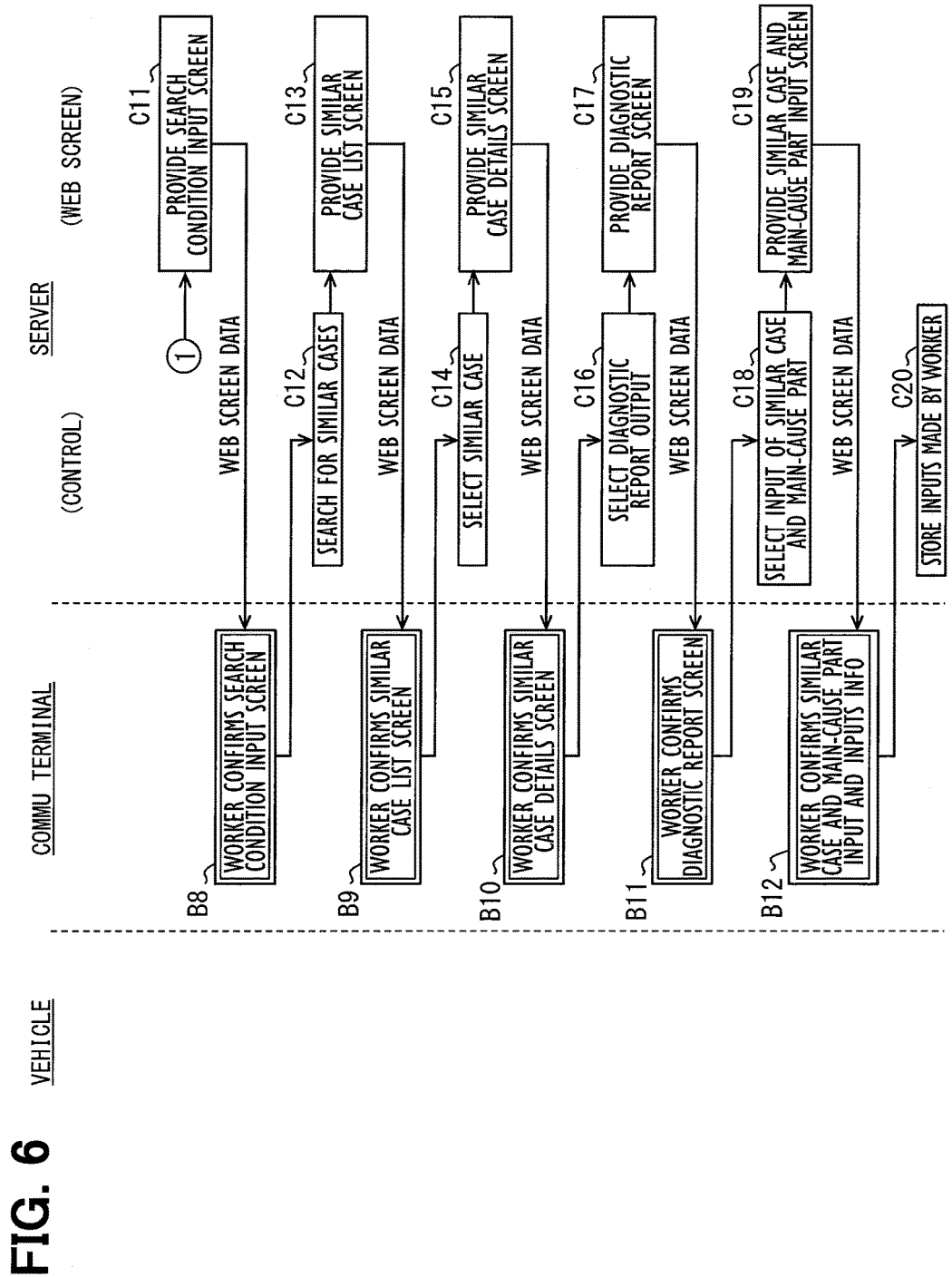
FIG. 6 is a second diagram illustrating a flow of processing in a vehicle repair support system.

The communication terminal 4 is, for example, a tablet terminal which can be carried by a worker to diagnose and repair a vehicle. A worker carrying a communication terminal 4 can diagnose and repair a vehicle while viewing and checking the WEB screen displayed at the communication terminal 4, so that a working area of the worker is not limited. The communication terminal 4 includes, as shown in FIG. 4, a controller 4a, a connector 4b, a wide-range wireless communication unit 4c, a command conversion unit 4d, a display unit 4e, an operation acceptance unit 4f, and a storage unit 4g.

The controller 4a includes a microcomputer which includes, for example, a CPU, a ROM, and a RAM. The controller 4a controls the overall operation of the communication terminal 4 by executing, with the CPU, computer programs stored in the ROM. The connector 4b is a connection terminal complying with the OBD (On Board Diagnostic) 2 standard. A connection cable 10 used to obtain vehicle information from the vehicle 9 can be connected to the connector 4b. In the present embodiment, the communication terminal 4 and the vehicle 9 are coupled to each other via the connection cable 10, or alternatively, the communication terminal 4 and the vehicle 9 may be wirelessly coupled to each other.

The wide-range wireless communication unit 4c can be coupled to the Internet 5. In a state of being coupled to the server 2 via the Internet 5, the wide-range wireless communication unit 4c can receive WEB screen data (downloadable) from the server 2 and can transmit the vehicle basic information and vehicle information obtained from the vehicle 9 to the server 2 via the M2M server 3. The command conversion unit 4d makes conversion (protocol conversion) between the data format (protocol) of the vehicle basic information and vehicle information exchanged between the communication terminal 4 and the vehicle 9 and the data format of the vehicle basic information and vehicle information exchanged between the communication terminal 4 and the server 2 via the Internet 5. The display unit 4e is made up of, for example, a liquid crystal display having a touch control function.

The controller 4a includes a WEB browser (Internet browser, WWW browser) installed therein. Using the functions of the WEB browser, the controller 4a can display a WEB screen composed using the WEB screen data received from the server 2 by the wide-range wireless communication unit 4c and also can make hyperlink tracing. The operation acceptance unit 4f includes, for example, touch switches formed on the WEB screen displayed on the display unit 4e and accepts inputting of settings by worker operation. The storage unit 4g stores various data required by the controller 4a to execute various kinds of data processing.

The vehicle 9 includes a connector 9a to which the above-mentioned connection cable 10 can be connected, a first controller 11a, a second controller 12a, a third controller 13a, and a fourth controller 14a all coupled with the connector 9a via a CAN (Controller Area Network) 9b. The first controller 11a detects turning on/off of an ACC switch 11b and has the detection result indicated by a first indication unit 11c (indicator). The second controller 12a detects the amount of operation of an accelerator pedal 12b (depth of pedal depression) and has the detection result indicated by a second indication unit 12c (tachometer). The third controller 13a detects the setting (e.g., high speed, medium speed, low speed, or off) of a wiper switch 13b and has the detection result indicated by a third indication unit 13c (indicator). The fourth controller 14a detects the setting (e.g., all lights, road lights, or off) of the light switch 14b and has the detection result indicated by a fourth indication unit 14c (indicator).

As the result of detecting turning on/off of the ACC switch 11b is indicated by the first indication unit 11c, the worker can confirm turning on/off of the ACC switch 11b. Also, as the result of detecting the depth of depression of the accelerator pedal 12b is indicated by the second indication unit 12c, the worker can confirm the depth of depression of the accelerator pedal 12b. Also, as the result of detecting the setting of the wiper switch 13b is indicated by the third indication unit 13c, the worker can confirm the setting of the wiper switch 13b. Also, as the result of detecting the setting of the light switch 14b is indicated by the fourth indication unit 14c, the worker can confirm the setting of the light switch 14b.

When connected to the vehicle 9 via the connection cable 10, the communication terminal 4 transmits requests for the vehicle basic information and vehicle information to the vehicle 9 and receives (obtains) the vehicle basic information and vehicle information from the vehicle 9. The vehicle basic information refers to, for example, information about the ID (Identification Information) of an ECU (Electronic Control Unit) mounted on the vehicle 9 and is used to determine whether data communication can be executed between the server 2 and the vehicle 9. The vehicle information includes diagnostic information and operation data. The diagnostic information is information about DTC (diagnostic trouble codes), FFD (freeze frame data), pending, etc. of various sensors and actuators included in the ECU mounted in the vehicle 9. The operation data represents information about, for example, the controlled condition of various sensors and actuators represented by, for example, engine speed and engine coolant temperature, the on/off setting of the ACC switch 11b, the depth of depression of the accelerator pedal 12b, the setting of the wiper switch 13b, and the setting of the light switch 14b. When the vehicle condition is changed by the worker, the change is reflected in the vehicle information. For example, when the worker operates (depresses) the accelerator pedal 12b, the resultant change in the depth of depression of the accelerator pedal 12b is reflected in the vehicle information.

In the above configuration, the vehicle basic information and vehicle information transmitted from the communication terminal 4 is received by the server 2 via the M2M server 3 as shown in FIG. 1. On the other hand, the WEB screen data transmitted from the server 2 is received by the communication terminal 4 without going through the M2M server 3. Namely, the path through which the vehicle basic information and vehicle information obtained from the vehicle 9 is transmitted from the communication terminal 4 to the server 2 differs from the path through which the WEB screen data transmitted from the server 2 is received by the communication terminal 4.

The operation of the above configuration will be described below with reference to FIGS. 5 to 24.

The communication terminal 4 connected to the server 2 via the Internet 5 can receive WEB screen data from the server 2 using the functions of the WEB browser. The communication terminal 4 can then compose a WEB screen using the received WEB screen data and display the composed WEB screen. When the worker selects a vehicle registration item on the main menu screen (B0) displayed on the display unit 4e, the wide-range wireless communication unit 4c of the communication terminal 4 transmits a request for starting vehicle registration to the server 2 (B1).

When the request for starting vehicle registration transmitted from the communication terminal 4 is received at the communication controller 6f (C1), the server 2 selects a vehicle registration screen out of the WEB screens stored in the WEB screen storage unit 6e and provides the selected vehicle registration screen (C2). When the vehicle registration screen is provided by the server 2, the communication terminal 4, using the functions of the WEB browser, receives the WEB screen data to compose the vehicle registration screen from the server 2 and displays the vehicle registration screen composed using the received WEB screen data on the display unit 4e. Namely, the worker, while viewing the vehicle registration screen displayed at the communication terminal 4 (B2), can register the vehicle 9 to be repaired (C3) and can proceed to the next step. Also, when the worker selects a repair support item on the main menu screen (B3) displayed at the display unit 4e, the wide-range wireless communication unit 4c of the communication terminal 4 transmits a request for starting repair support to the server 2 (B4).

When the request for starting repair support transmitted from the communication terminal 4 is received at the communication controller 6f (C4), the server 2 selects a vehicle selection screen out of the WEB screens stored in the WEB screen storage unit 6e and provides the selected vehicle selection screen (C5). When the vehicle selection screen is provided by the server 2, the communication terminal 4, using the functions of the WEB browser, receives the WEB screen data to compose the vehicle selection screen from the server 2 and displays the vehicle selection screen composed using the received WEB screen data on the display unit 4e. Namely, the worker, while viewing the vehicle selection screen displayed at the communication terminal 4 (B5), can select the vehicle 9 targeted for repair support and can proceed to the next step.

When the vehicle 9 targeted for repair support is a new vehicle (a vehicle that becomes the target for repair support for the first time and that has not been the target of the vehicle-repair support system 1 before), the worker fixes the vehicle 9 as the target of repair support by inputting the vehicle registration number and chassis number. On the other hand, when the vehicle 9 targeted for repair support is not a new vehicle (a vehicle that was the target of the vehicle-repair support system 1 at least once before, i.e. a vehicle that becomes the target of repair support not for the first time), the worker fixes the vehicle 9 as the target of repair support by selecting the vehicle 9 out of the vehicles whose registration numbers and chassis numbers are already registered.

When the worker fixes the vehicle 9 as the target of repair support, the server 2 selects the vehicle 9 (C6) and makes an inquiry about the vehicle 9 targeted for repair support (C7) (a first step). Namely, the server 2 selects and provides an inquiry screen out of the WEB screens stored in the WEB screen storage unit 6e (C8). When the inquiry screen is provided by the server 2, the communication terminal 4, using the functions of the WEB browser, receives the WEB screen data to compose the inquiry screen from the server 2 and displays the inquiry screen composed using the received WEB screen data on the display unit 4e. Namely, the worker, while viewing the inquiry screen displayed at the communication terminal 4 (B6), can process inquiries to the repair requester (can answer the inquiries).

Figure 13:
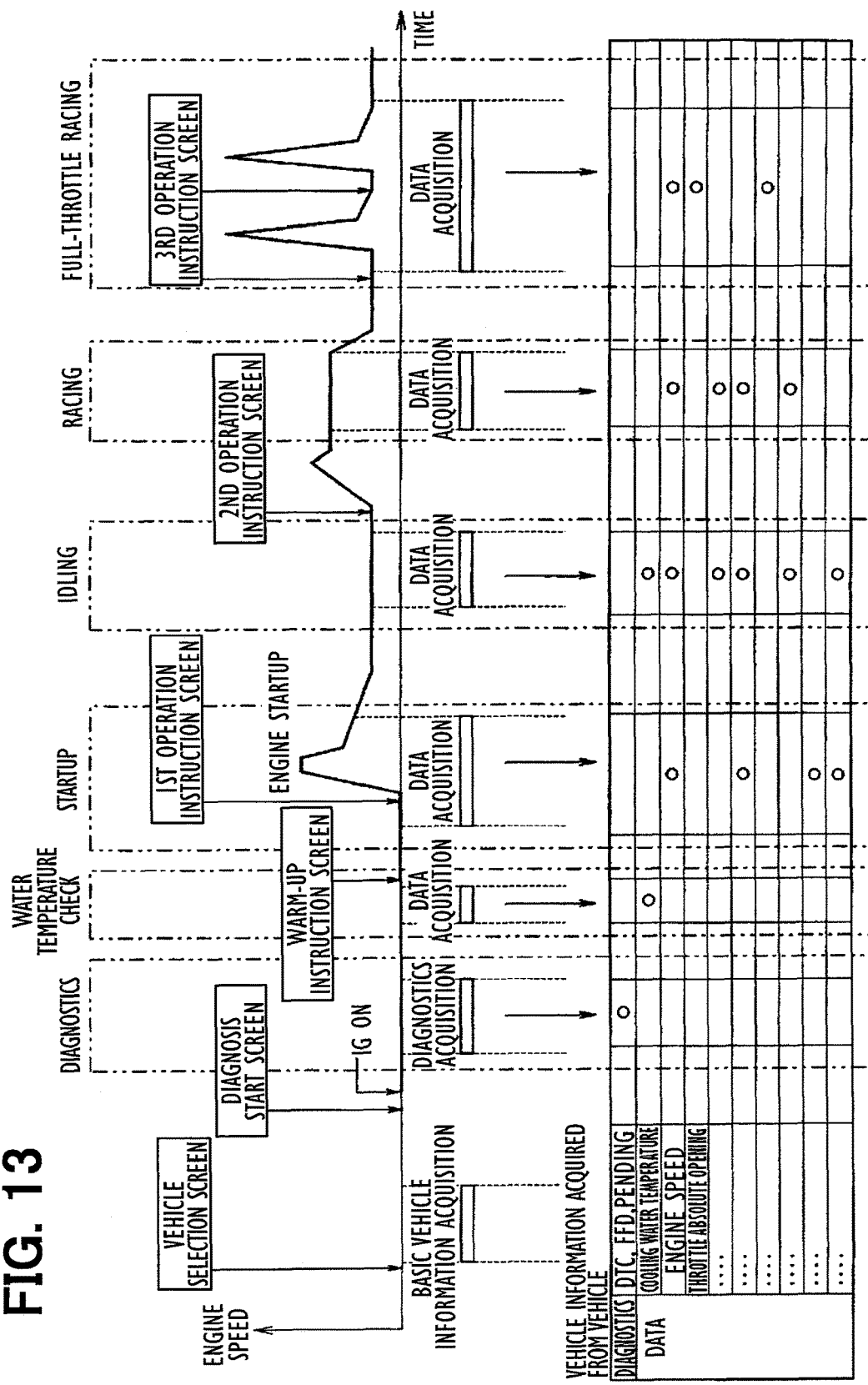
FIG. 13 illustrates an engine speed transition, screen changes, and vehicle information obtained from a vehicle.
Figure 14:
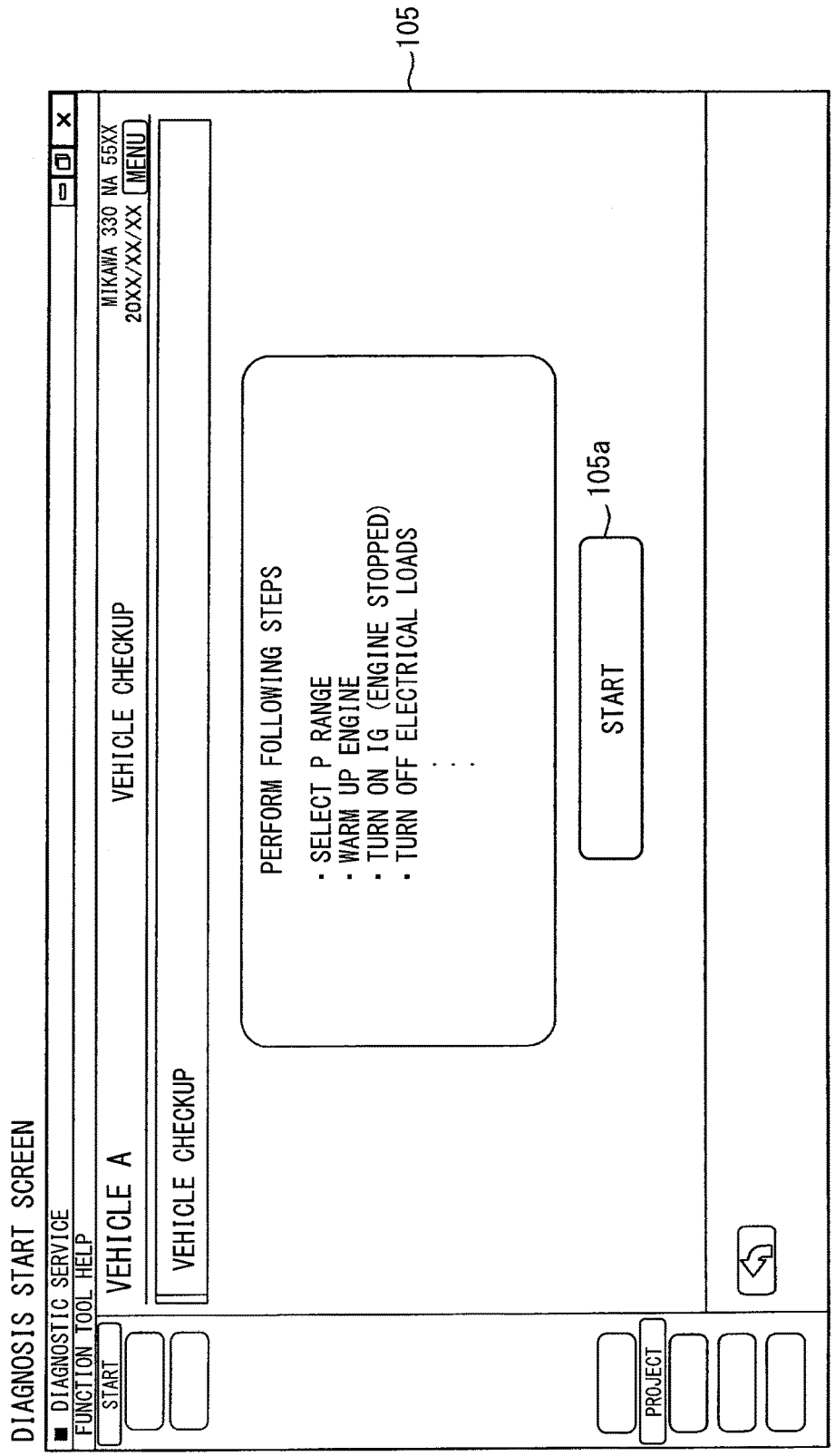
FIG. 14 illustrates a diagnosis starting screen.
Figure 15:
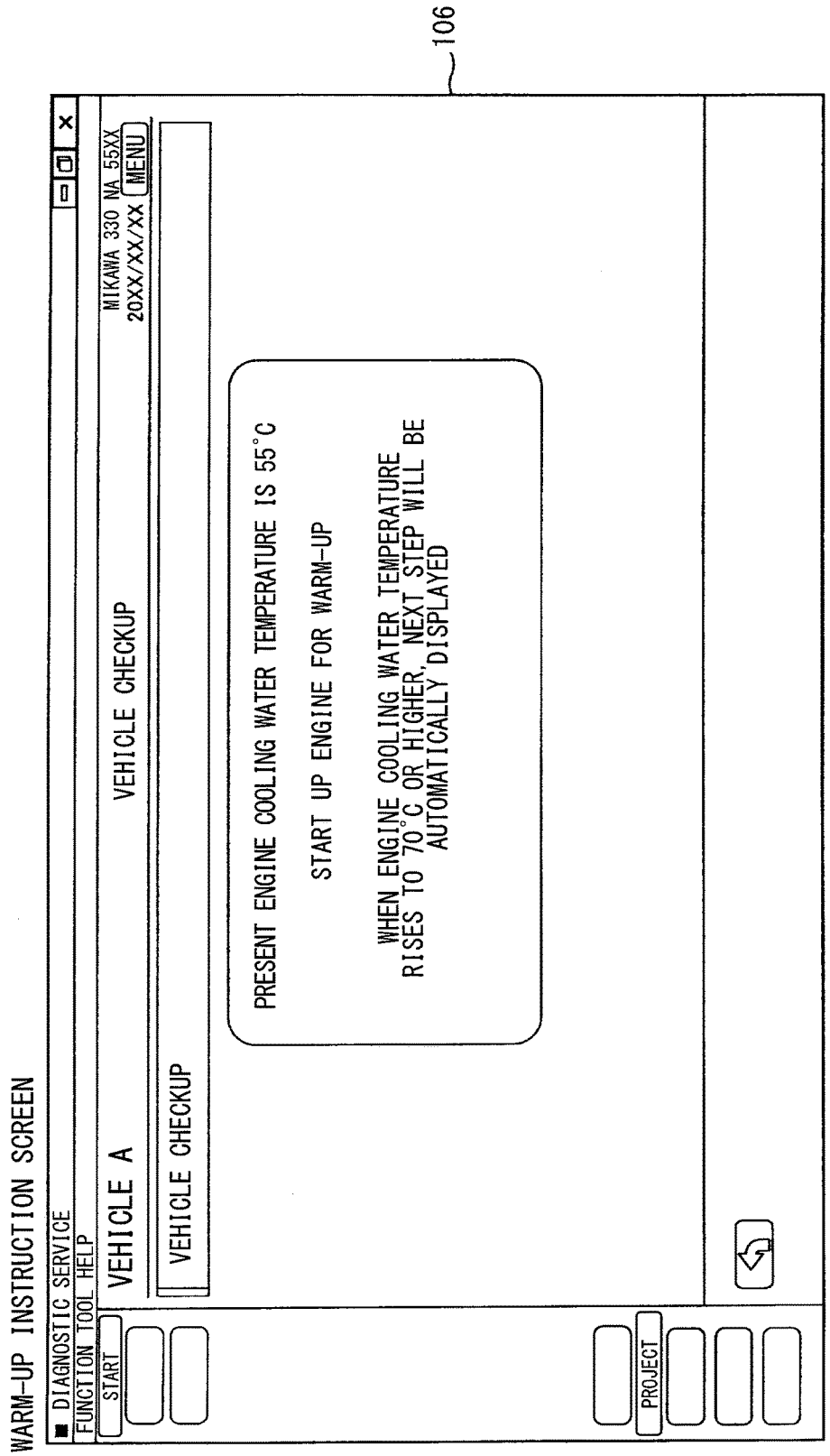
FIG. 15 illustrates a warm-up instruction screen.

After ending the inquiry, the server 2 stores the inquiry results in the repair support DB server 7. Subsequently, the server 2 diagnoses the vehicle 9 targeted for repair support (C9) (a fourth step). Namely, the server 2 successively selects, out of the WEB screens stored in the WEB screen storage unit 6e, diagnosis screens (a diagnosis starting screen, a warm-up instruction screen, a first operation instruction screen, a second operation instruction screen, and a third operation instruction screen respectively to be described later) and provides them (C10). When the diagnosis screens are successively provided by the server 2, the communication terminal 4, using the functions of the WEB browser, receives the WEB screen data for composing each diagnosis screen from the server 2 and displays each diagnosis screen composed using the received WEB screen data on the display unit 4e. Namely, the worker, while viewing each diagnosis screen displayed at the communication terminal 4 (B7), can carry out the later-described diagnosis as to, for example, ignition, start-up, idling, racing, and full-open racing as shown in FIG. 13.

After ending the diagnosis, the server 2 stores the diagnosis results in the repair support DB server 7. Subsequently, the server 2 selects, out of the WEB screens stored in the WEB screen storage unit 6e, a search condition input screen and provides the selected screen (C11). When the search condition input screen is provided by the server 2, the communication terminal 4, using the functions of the WEB browser, receives the WEB screen data to compose the search condition input screen and displays the search condition input screen composed using the received WEB screen data on the display unit 4e. Namely, the worker, while viewing the search condition input screen displayed at the communication terminal 4 (B8), can input search conditions.

When the search condition is inputted by the worker, the server 2 searches the repair support DB server 7 for similar cases based on the search condition inputted by the worker (C12) (a second step). The server 2 selects, from the WEB screens stored in the WEB screen storage unit 6e, a similar-case list screen frame (form) and provides a similar-case list screen showing in the frame thereof the results of the search for similar cases (C13) (a third step). When the similar-case list screen is provided by the server 2, the communication terminal 4, using the functions of the WEB browser, receives the WEB screen data to compose the similar-case list screen from the server 2 and displays the similar-case list screen composed using the received WEB screen data on the display unit 4e. Namely, the worker viewing the similar-case list screen displayed at the communication terminal 4 (B9) can grasp a similar case meeting the search conditions and can proceed to the next step.

When the worker selects a similar case from the similar-case list (C14), the server 2 selects, from the WEB screens stored in the WEB screen storage unit 6e, a similar-case details screen frame (form) and provides a similar-case details screen showing in the frame thereof details of the selected similar case (C15). When the similar-case details screen is provided by the server 2, the communication terminal 4, using the functions of the WEB browser, receives the WEB screen data to compose the similar-case details screen from the server 2 and displays the similar-case details screen composed using the received WEB screen data on the display unit 4e. Namely, the worker viewing the similar-case details screen displayed at the communication terminal 4 (B9) can grasp details of the selected similar case (B10) and can proceed to the next step.

When the worker selects a diagnostic report output (C16), the server 2 selects, from the WEB screens stored in the WEB screen storage unit 6e, a diagnostic report screen frame (form) and provides a diagnostic report screen describing in the frame thereof the selected similar case (C17). When the diagnostic report screen is provided by the server 2, the communication terminal 4, using the functions of the WEB browser, receives the WEB screen data to compose the diagnostic report screen from the server 2 and displays the diagnostic report screen composed using the received WEB screen data on the display unit 4e. Namely, the worker viewing the diagnostic report screen displayed at the communication terminal 4 (B11) can grasp the contents of diagnosis and can proceed to the next step.

Also, when the worker selects input of a similar case and a main-cause part (C18), the server 2 provides a similar case and main-cause part input screen (C19) selected from the WEB screens stored in the WEB screen storage unit 6e. When the similar case and main-cause part input screen is provided by the server 2, the communication terminal 4, using the functions of the WEB browser, receives the WEB screen data to compose the input screen from the server 2 and displays the input screen composed using the received WEB screen data on the display unit 4e. When, on the input screen, the worker inputs information about the item he/she actually worked on (e.g., as to symptoms, results, trouble removal, and main parts replaced) (B12) and presses the "Enter" button, the communication terminal 4 transmits the contents of input by the worker to the server 2. When the contents of input by the worker are received from the communication terminal 4, the server 2 stores the received contents in the repair support DB server 7 (C20). In the above-described series of processing, diagnosis is performed after an inquiry. Alternatively, the diagnosis may be performed before an inquiry.

Figure 7:
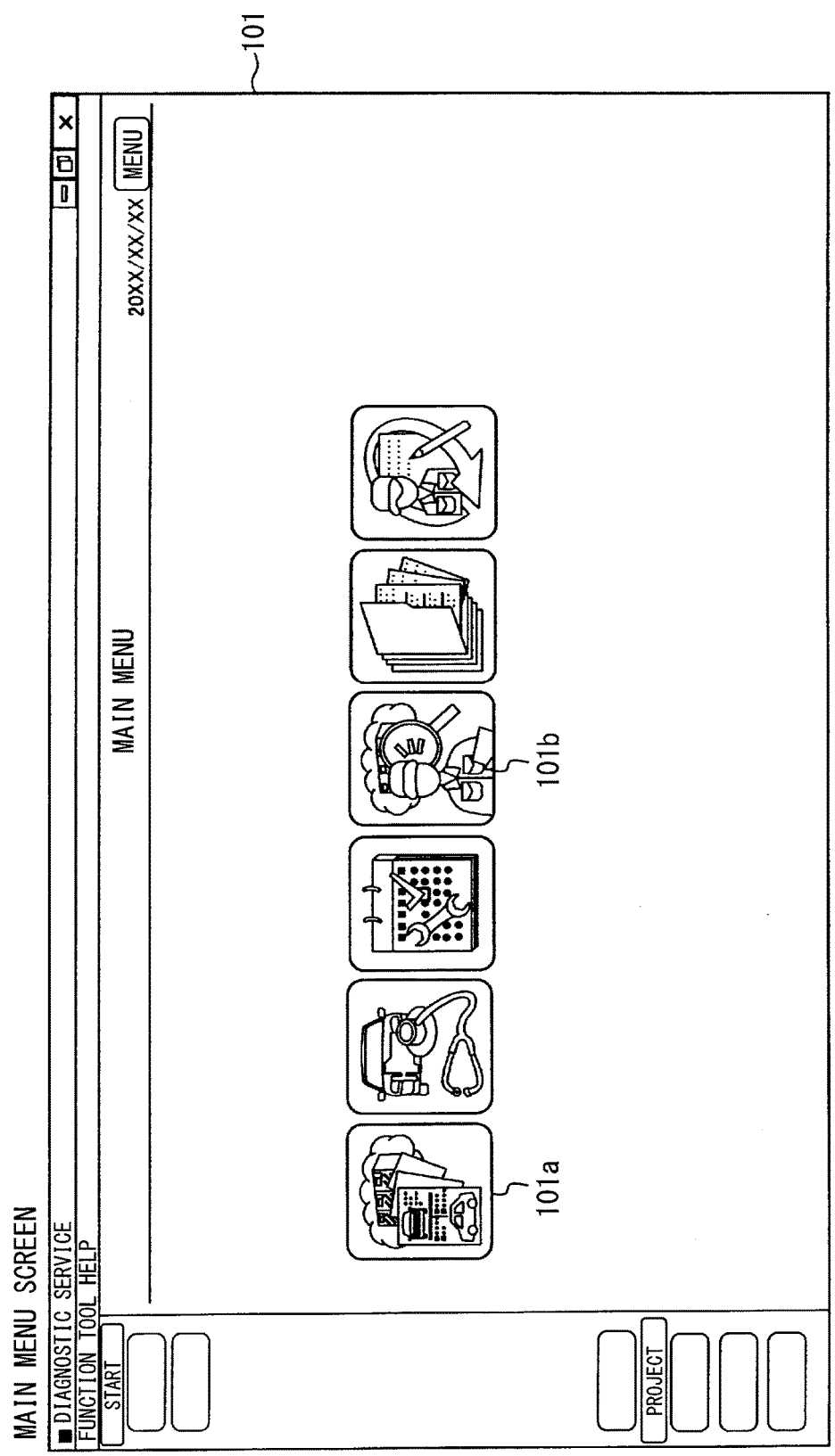
FIG. 7 illustrates a first main menu screen.

In the following, a concrete example of the above-described series of processing will be described with reference to FIGS. 7 to 25. The example processing described below assumes that an inquiry is made about an engine (a drive mechanism) and the engine is diagnosed. As shown in FIG. 7, when a main menu screen 101 is displayed at the communication terminal 4 and the worker presses (selects) the "Vehicle registration" icon 101a, the communication terminal 4 transmits an operation signal to the server 2 indicating that the worker pressed the "Vehicle registration" icon 101a.

Figure 8:
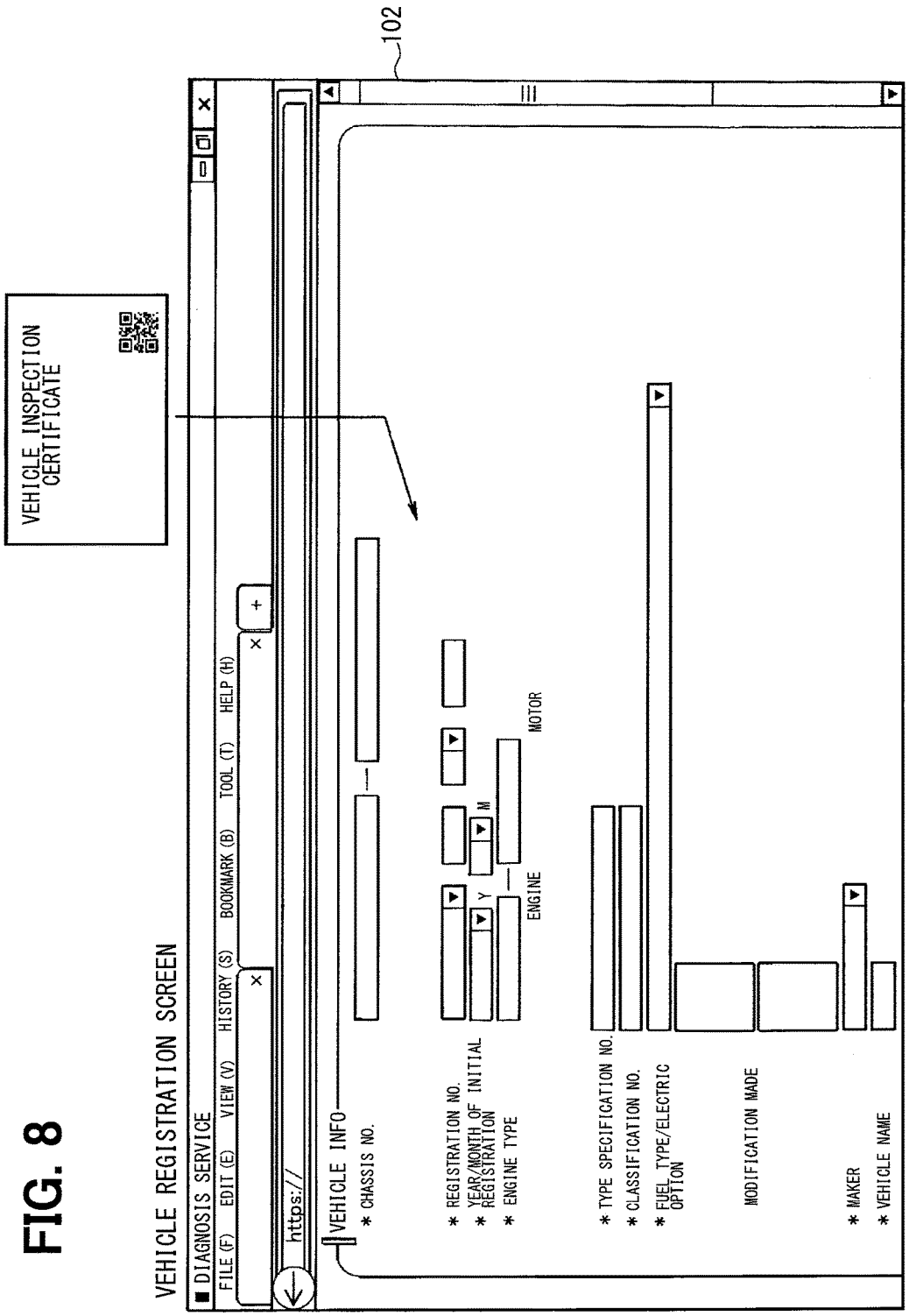
FIG. 8 illustrates a vehicle registration screen.

When the operation signal transmitted from the communication terminal 4 is received, the server 2 transmits the WEB screen data to the communication terminal 4. When the WEB screen data is received from the server 2, the communication terminal 4 composes the vehicle registration screen 102 using the received WEB screen data and displays the vehicle registration screen 102 as shown in FIG. 8. The worker registers the vehicle 9 targeted for repair support by inputting necessary items (e.g., chassis number, registration number, etc.) on the vehicle registration screen 102. In cases where the communication terminal 4 has an information code reading function, the items to be set may be inputted in such a manner that information codes (e.g., QR (Quick Response) codes (registered trademark)) printed on a vehicle inspection certificate are read using the function. Next, when, the main menu screen 101 is displayed at the communication terminal 4 and the worker presses (selects) the "Repair support" icon 101b, the communication terminal 4 transmits a signal to the server 2 indicating that the worker pressed the "Repair support" icon 101b.

Figure 9:
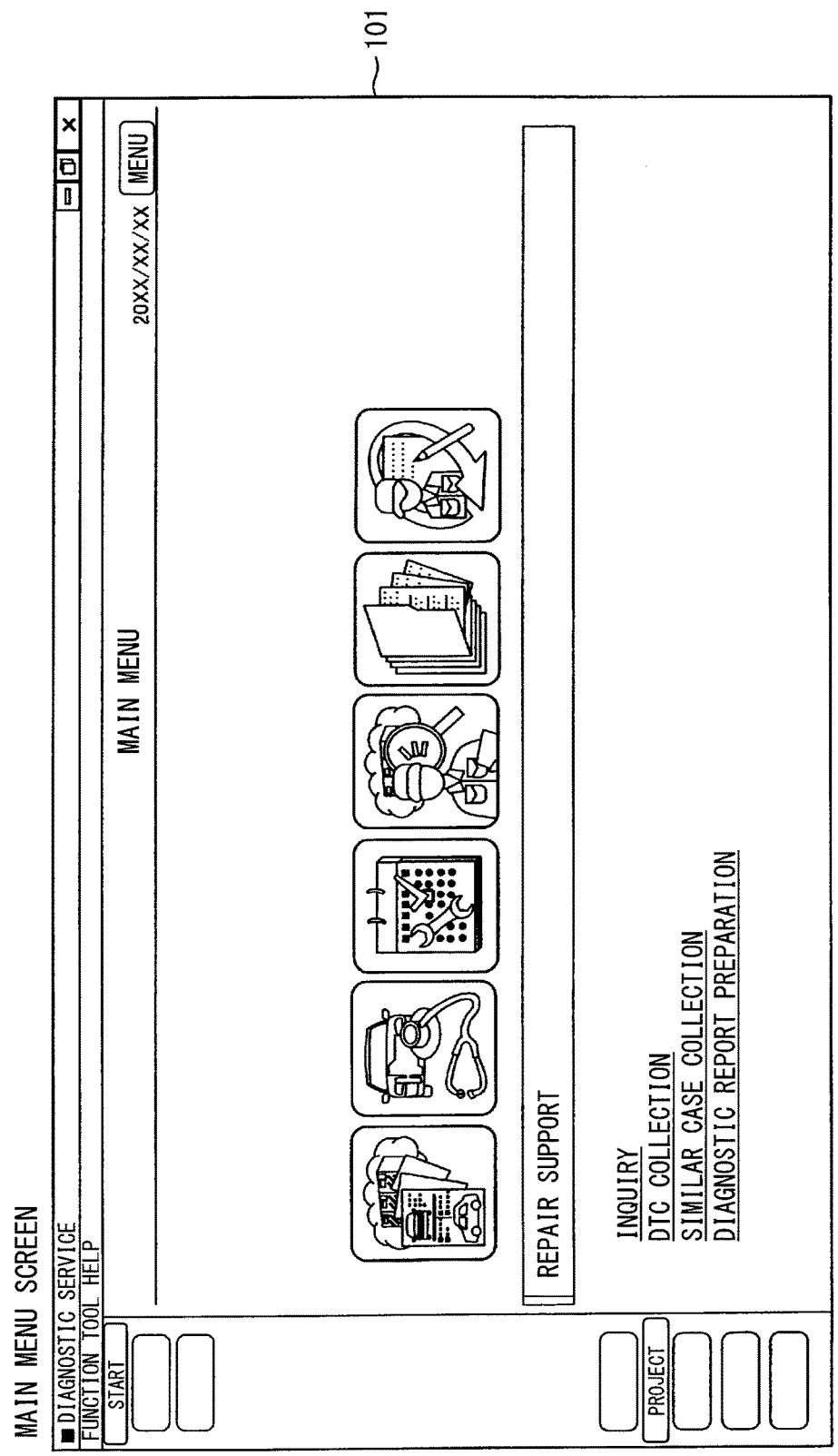
FIG. 9 illustrates a second main menu screen.
Figure 10:
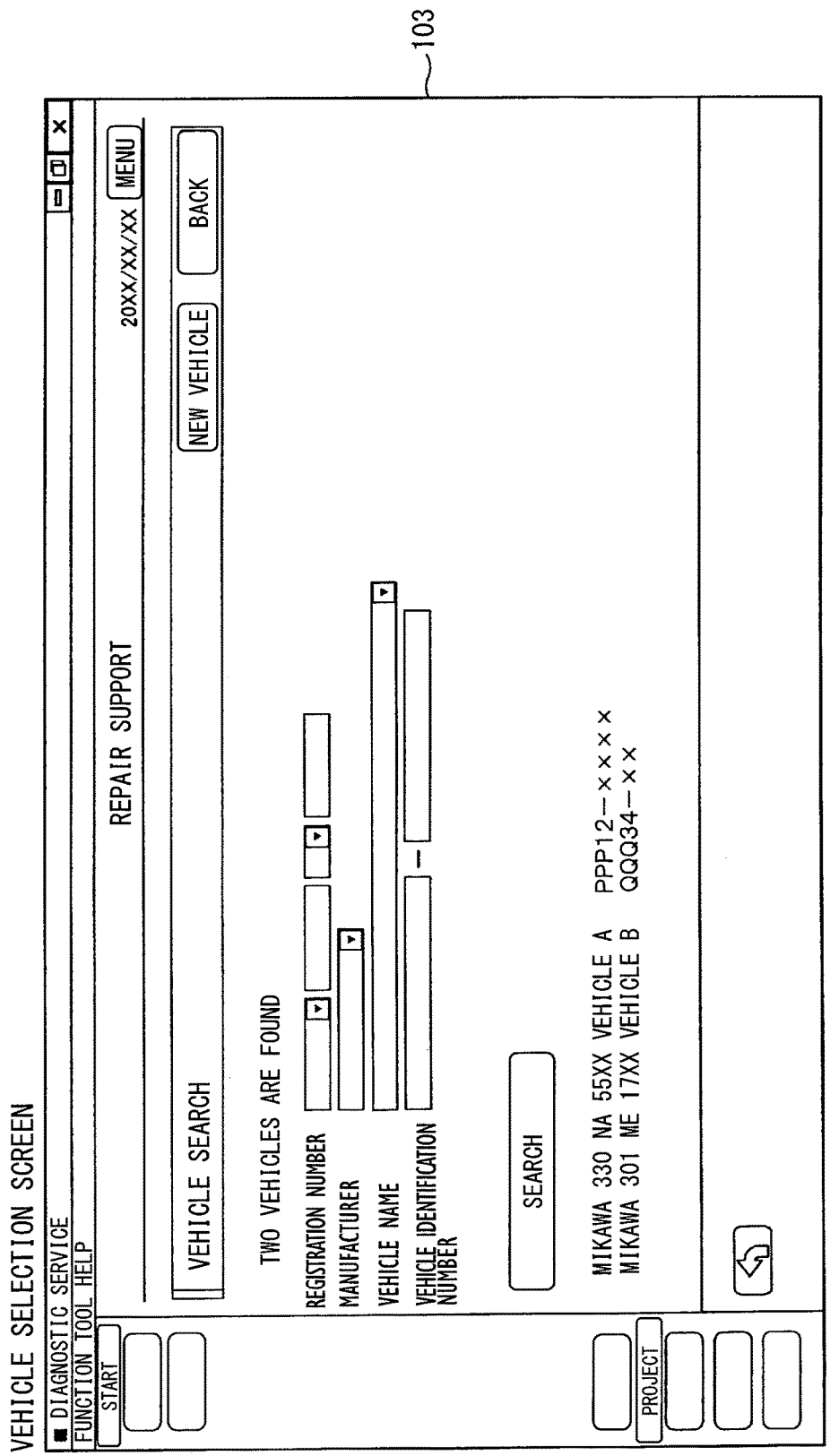
FIG. 10 illustrates a vehicle selection screen.

When the operation signal transmitted from the communication terminal 4 is received, the server 2 transmits the WEB screen data to the communication terminal 4. When the WEB screen data is received from the server 2, the communication terminal 4 displays, as shown in FIG. 9, "Repair support" on the main menu screen 101 indicating that repair support is going to be performed. Subsequently, the server 2 transmits the WEB screen data to compose a vehicle selection screen 103 to the communication terminal 4. When the WEB screen data is received from the server 2, the communication terminal 4 composes the vehicle selection screen 103 using the received WEB screen data and displays the vehicle selection screen 103 as shown in FIG. 10.

When the worker selects the vehicle 9 targeted for repair support, the communication terminal 4 transmits a signal to the server 2 indicating that the worker has selected the vehicle 9 targeted for repair support. In FIG. 10, for example, "Vehicle A" represents a vehicle name and "PPP12-xxxx" represents a chassis number.

Figure 11:
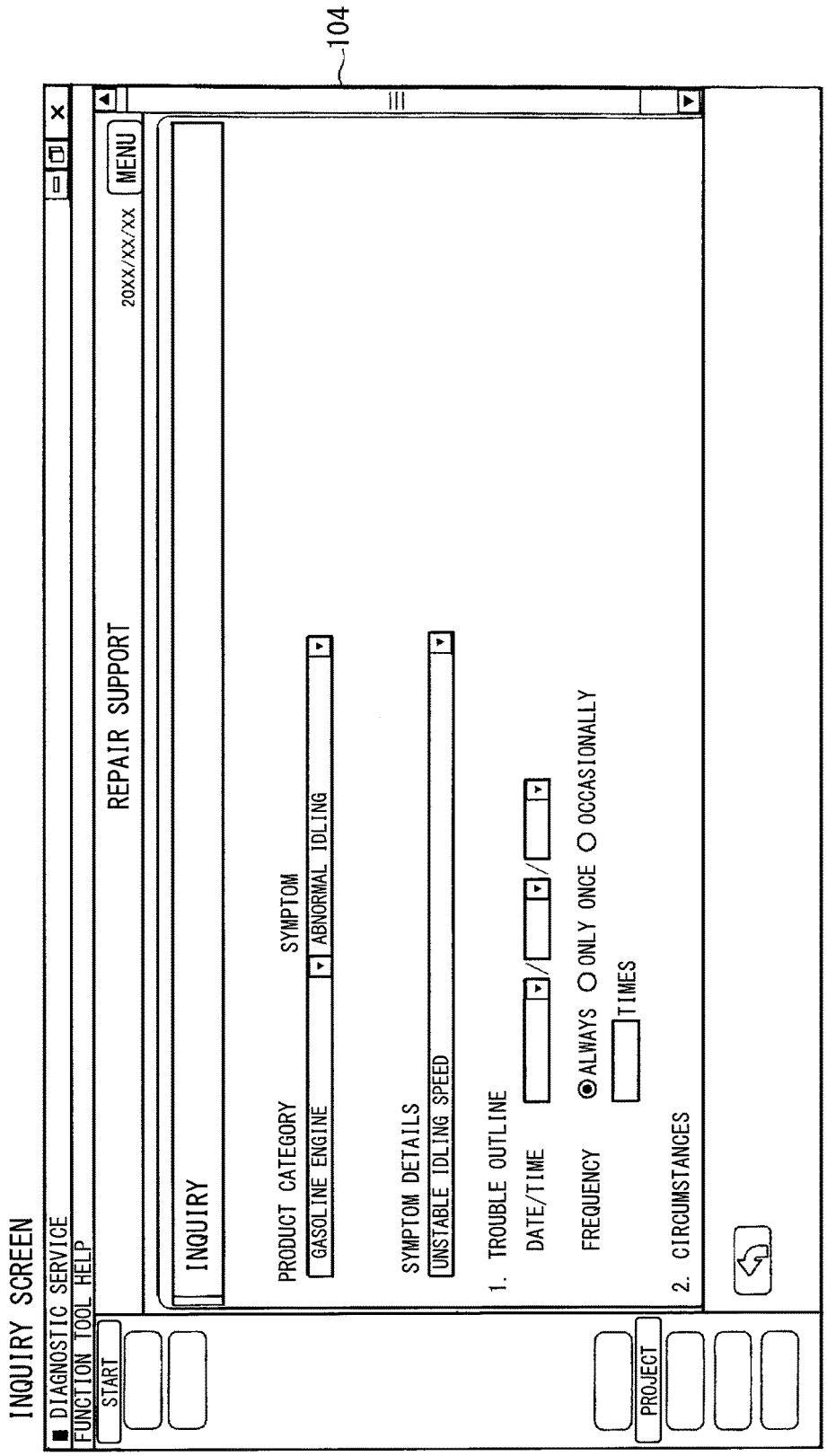
FIG. 11 illustrates an inquiry screen.

When the operation signal transmitted from the communication terminal 4 is received, the server 2 transmits the WEB screen data to compose an inquiry screen 104 to the communication terminal 4. When the WEB screen data is received from the server 2, the communication terminal 4 composes the inquiry screen 104 using the received WEB screen data and displays the inquiry screen 104 as shown in FIG. 11. The worker answers the inquiry from the server 2 by inputting, on the inquiry screen 104, information about necessary items shown on the screen. FIG. 12 shows inquiry contents. Namely, the worker is to input information about product category, symptom, symptom details, trouble outline, circumstances, and relevant conditions. Note that the inquiry contents shown in FIG. 12 only represent an example of an inquiry. The inquiry may include more items or fewer items. As described above, the worker can answer the inquiry on the inquiry screen 104 that is provided by the server 2 via the Internet 5. In this case, since the inquiry screen 104 is provided by the server 2, the inquiry items can be kept uniform. This prevents the items included in the inquiry from resulting in being insufficient depending on the technical level of the impairer. Also, it becomes possible to include, in the inquiry, finely classified items, for example, according to product category, symptom, and symptom details.

When the inquiry is completed, the server 2 performs diagnosis. As an example, a case where the server 2 diagnoses an engine (a drive mechanism) as shown in FIG. 13 will be described here. When diagnosing an engine, the server 2 successively transmits the WEB screen data to compose diagnosis screens such as a diagnosis starting screen 105, a warm-up instruction screen 106, a first operation instruction screen 107, a second operation instruction screen 108, a third operation instruction screen 109 as shown in FIGS. 14 to 19 to the communication terminal 4. When the WEB screen data is received from the server 2, the communication terminal 4 composes the screens 105 to 109 using the respective WEB screen data received and displays the composed screens one by one.

The diagnosis starting screen 105 gives instructions to the worker in starting diagnosis. By viewing the diagnosis starting screen 105, the worker can grasp the instructions to establish such conditions as shift lever in P range, engine warmed up, IGON (engine stopped), and electric load off before starting diagnosis.

When the worker presses the "Start" button 105a on the diagnosis starting screen 105, the server 2 transmits a diagnosis request from the communication AP server 8 to the communication terminal 4 via the M2M server 3. When the diagnosis request transmitted from the server 2 is received at the wide-range wireless communication unit 4f, the communication terminal 4 converts the received diagnosis request into a diagnosis request command and transmits the diagnosis request command to the vehicle 9 via the connection cable 10. When the diagnosis request transmitted from the communication terminal 4 is received, the vehicle 9 analyzes the received diagnosis request and transmits the diagnostic information specified by the diagnosis request to the communication terminal 4 via the connection cable 10. When the diagnostic information transmitted from the vehicle 9 is received, the communication terminal 4 converts the received diagnostic information into a diagnosis command and transmits the diagnosis command from the wide-range wireless communication unit 4c to the server 2 via the M2M server 3.

Subsequently, the server 2 transmits a data request from the communication AP server 8 to the communication terminal 4 via the M2M server 3. When the data request transmitted from the server 2 is received at the wide-range wireless communication unit 4f, the communication terminal 4 converts the received data request into a data request command and transmits the data request command to the vehicle 9 via the connection cable 10. When the data request transmitted from the communication terminal 4 is received, the vehicle 9 analyzes the received data request and transmits the data specified by the data request to the communication terminal 4 via the connection cable 10. When the data transmitted from the vehicle 9 is received, the communication terminal 4 converts the received data into a data command and transmits the data command from the wide-range wireless communication unit 4c to the server 2 via the M2M server 3.

The warm-up instruction screen 106 obtains data indicating the current temperature of the engine coolant from the vehicle 9 and informs the worker that warming up is required. By viewing the warm-up instruction screen 106, the worker can grasp the current temperature of the engine coolant ("55° C." in the example shown in FIG. 15). The worker can also know that warming up is required because the current temperature of the engine coolant has not reached a predetermined temperature ("70° C." in the example shown in FIG. 15) and that, when the temperature of the engine coolant reaches the predetermined temperature, the next step to be taken is automatically shown. Note that, when the temperature of the engine coolant is at or above the predetermined temperature, the server 2 does not transmit the WEB screen data to compose the warm-up instruction screen 106 to the communication terminal 4, and the communication terminal 4 does not display the warm-up instruction screen 106.

Figure 16:
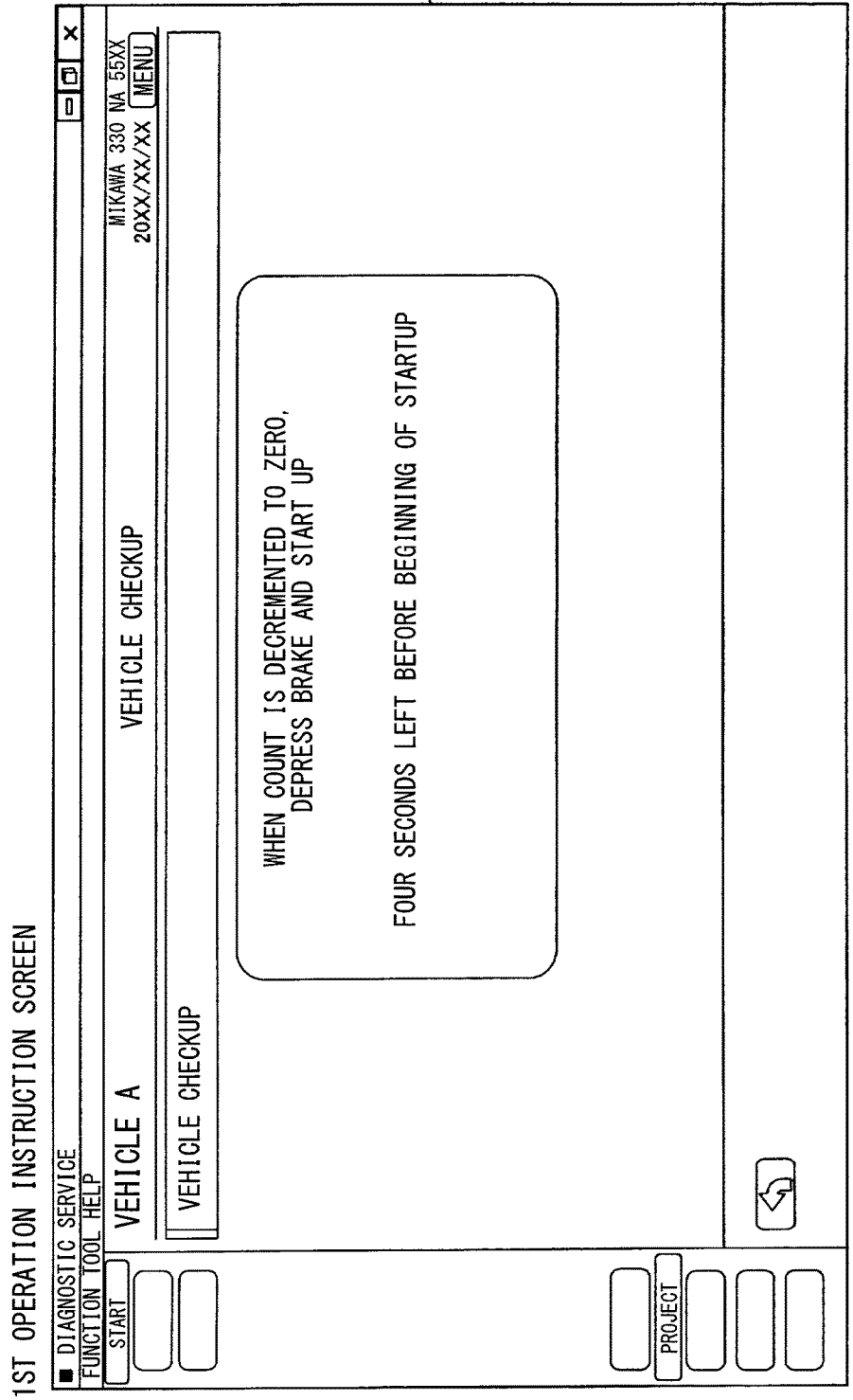
FIG. 16 illustrates a first operation instruction screen.
Figure 17:
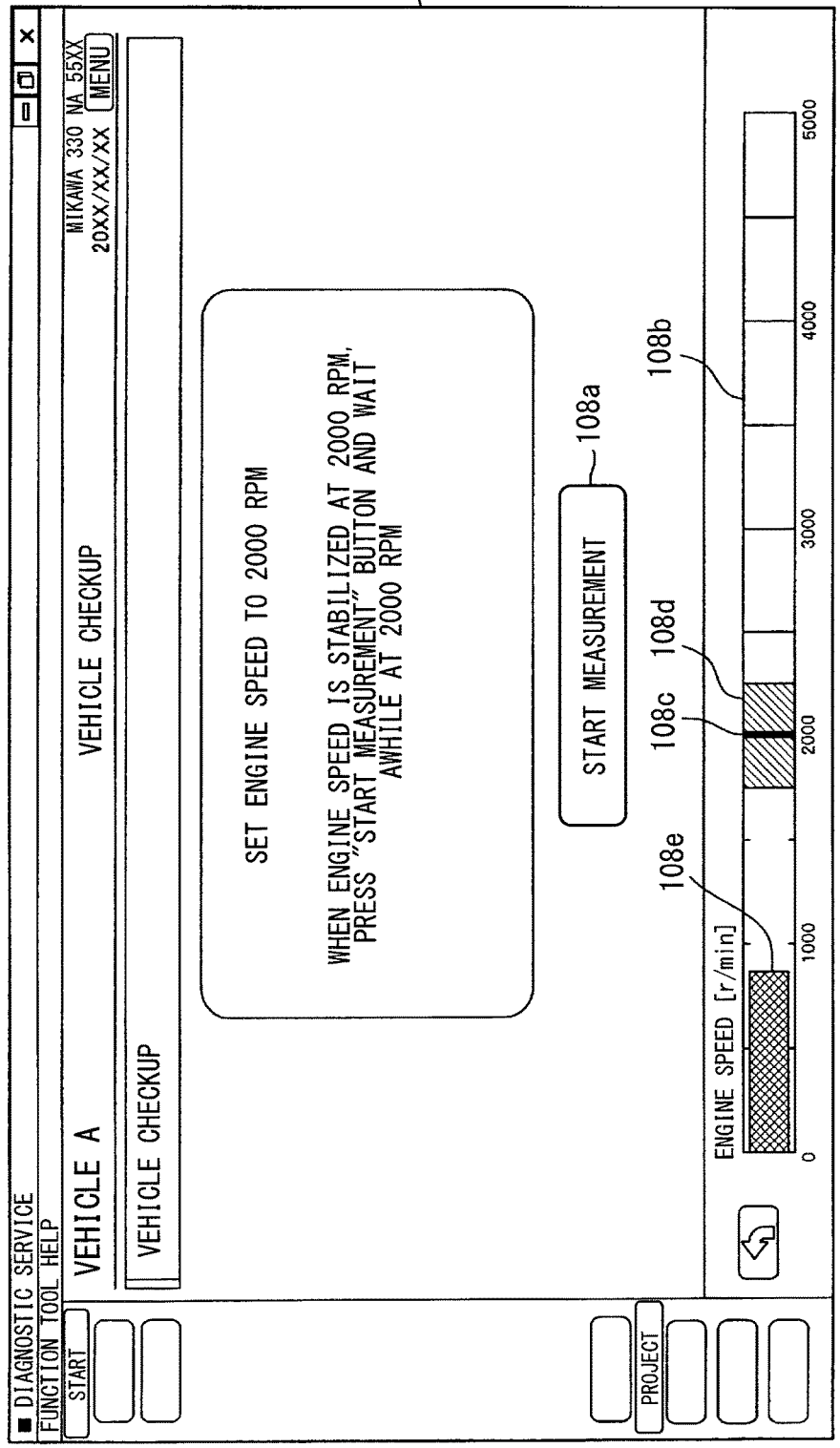
FIG. 17 illustrates an example of a second operation instruction screen.

The first operation instruction screen 107 gives an instruction to depress the brake pedal and start the engine to the worker as shown in FIG. 16. By viewing the operation instruction screen 107, the worker can know that the next step to take is to depress the brake pedal and start the engine and can also know when to depress the brake pedal and start the engine. When providing the first operation instruction screen 107 to urge the worker to depress the brake pedal and start the engine, the server 2 indicates the timing for starting the engine by means of a countdown. Namely, as described above, the path through which the vehicle basic information and vehicle information is transmitted from the communication terminal 4 to the server 2 differs from the path through which the WEB screen data is transmitted from the server 2 to the communication terminal 4. Therefore, if, in a state in which the server 2 has not completed preparations to receive data related with starting the engine from the communication terminal 4, the communication terminal 4 transmits data related with starting the engine, there is a possibility that the server 2 cannot receive the data. Taking this into consideration, the server 2 adjusts, using the first operation instruction screen 107, the timing for having the worker start the engine (establishes synchronization). In this way, the worker is allowed to start the engine only after the server 2 is readied to receive data related with starting of the engine from the communication terminal 4. Instead of indicating the timing for the worker to start the engine by means of a countdown, the timing for displaying the first operation instruction screen 107 may be adjusted. The timing of operation by the worker is similarly adjusted also on the second operation instruction screen 108 and the third operation instruction screen 109 to be described later.

The second operation instruction screen 108 instructs the worker to increase the engine speed to predetermined rpm (to "2000 rpm" in the example shown in FIG. 17) and maintain the increased engine speed. By viewing the second operation instruction screen 108, the worker can know that the next step to take is to increase the engine speed to predetermined rpm and maintain the increased engine speed. The second operation instruction screen 108 giving an instruction to increase the engine speed to predetermined rpm and maintain the increased engine speed shows a scale 108b covering an engine speed range ("0 to 5000 rpm" in the example shown in FIG. 17) allowing the worker to check the engine speed, a target line 108c, a target area 108d including the target line 108c, and a bar 108e representing the engine speed. The scale 108b, target line 108c, target area 108d, and bar 108e are shown in color.

Figure 18:
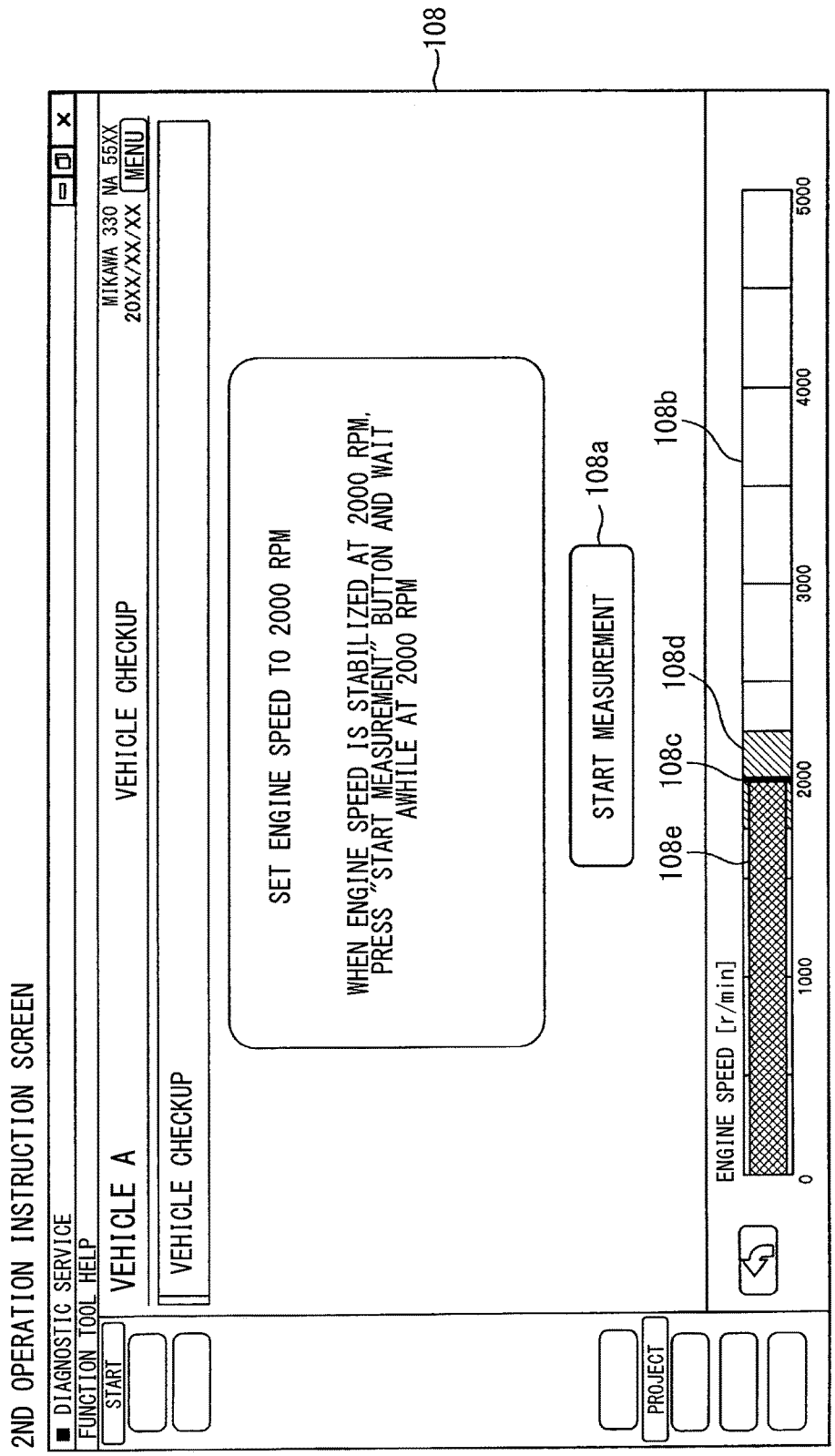
FIG. 18 illustrates another example of the second operation instruction screen.
Figure 19:
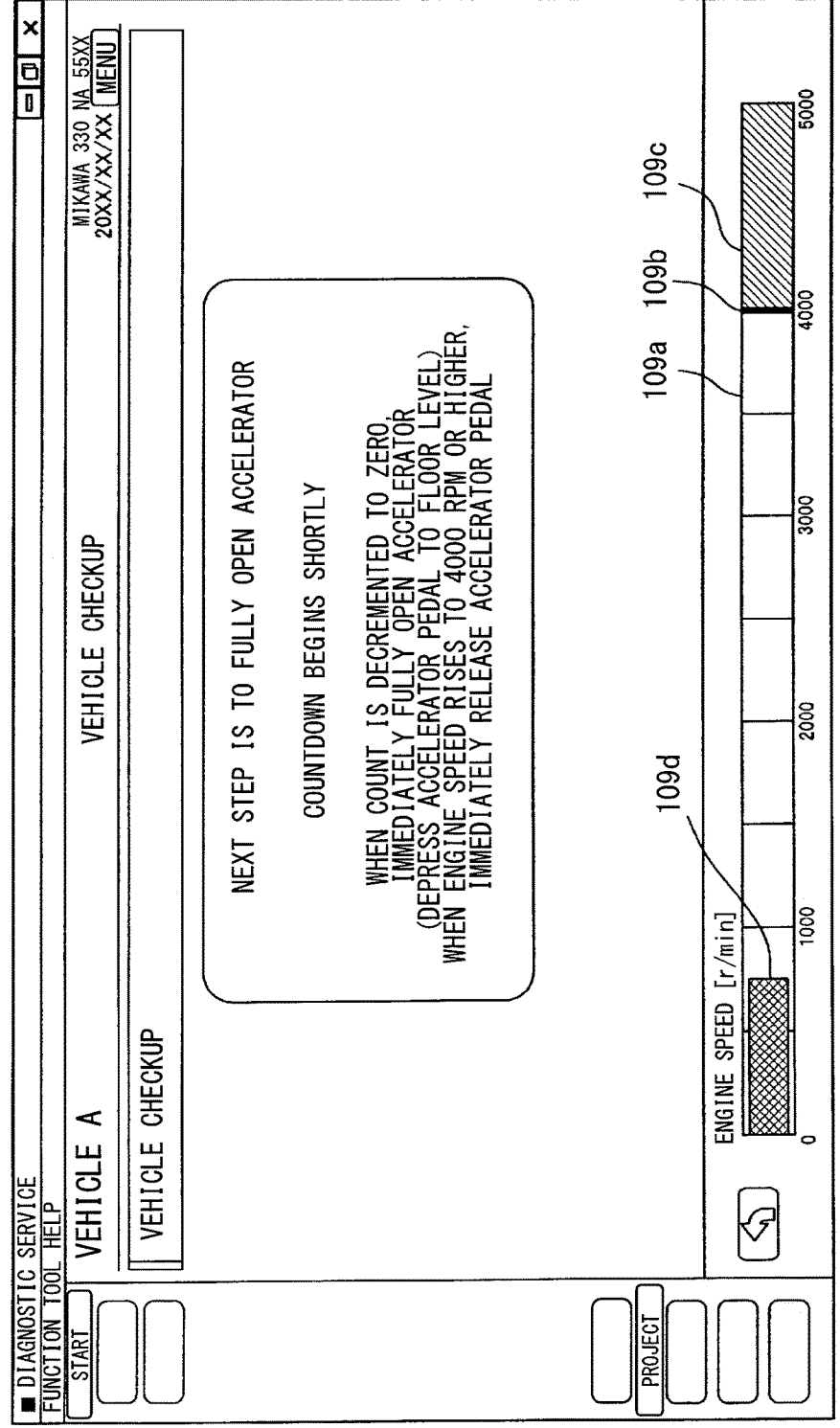
FIG. 19 illustrates a third operation instruction screen.

When the worker operates (depresses) the accelerator pedal 12b, the vehicle information including the engine speed corresponding to the depth of depression of the accelerator pedal 12b is transmitted from the vehicle 9 to the server 2 via the communication terminal 4 and the M2M server 3. As a result, the engine speed is reflected on the second operation instruction screen 108. To be specific, as shown in FIG. 18, the bar 108e representing the engine speed on the second operation instruction screen 108 shortens or lengthens in response to the worker's operation of the accelerator pedal 12b worker. In this case, it is necessary to adjust the timing of displaying the second operation instruction screen 108 so as to cause the worker to operate the accelerator pedal 12b after the server 2 preparations to receive the engine speed data are completed. With such adjustment made, the bar 108e representing the engine speed on the second operation instruction screen 108 shortens or lengthens in response to the worker's responding to operation of the accelerator pedal 12b worker. Namely, it is possible to avoid occurrence of a state in which the length of the bar 108e does not change even when the worker operates the accelerator pedal 12b or in which the length of the bar 108e changes in response to, with a delay, the worker's operation of the accelerator pedal 12b worker. This prevents the worker from feeling uncomfortable when observing the engine speed.

Since, as described above, the length of the bar 108e changes tracking the depth of worker's depression of the accelerator pedal 12b worker, the engine speed can be observed on the second operation instruction screen 108 even when no tachometer (engine speed indicator) is mounted in the vehicle 9 targeted for repair support. Also, since the second operation instruction screen 108 is provided as a WEB screen, the scale 108b can be set to a desired resolution (graduation). Therefore, even in cases where the vehicle 9 targeted for repair support is provided with a tachometer, setting the scale 108b to a higher resolution than that of the tachometer makes it possible to finely adjust the engine speed while viewing the second operation instruction screen 108.

The third operation instruction screen 109 gives an instruction to the worker to fully open the accelerator worker. By viewing the third operation instruction screen 109, the worker can know that the next step to take is to fully open the accelerator (fully depressing the accelerator pedal 12b). The third operation instruction screen 109 also shows a scale 109a, a target line 109b, a target area 109c, and a bar 109d so as to allow the worker to check the engine speed on the screen. Thus, the worker can perform diagnosis using a series of diagnosis screens (the diagnosis starting screen 105, warm-up instruction screen 106, first operation instruction screen 107, second operation instruction screen 108, and third operation instruction screen 109) provided by the server 2 via the Internet 5. The server 2 may obtain diagnostic information through the above series of processing or by using the DTC obtaining function included in the repair support service.

Figure 20:
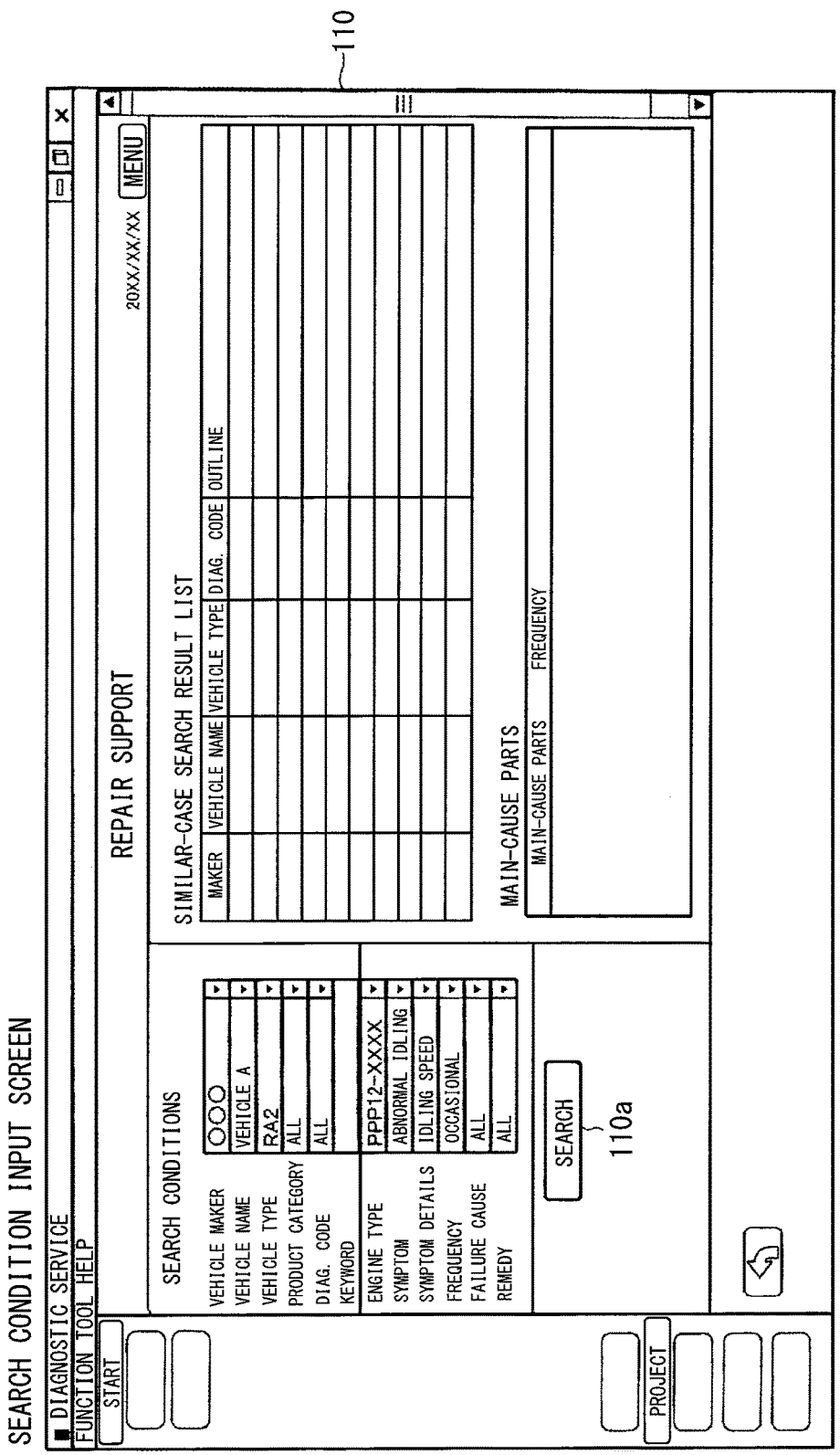
FIG. 20 illustrates a search condition input screen.

When the diagnosis is ended, the server 2 transmits the WEB screen data to compose a search condition input screen 110 to the communication terminal 4. When the WEB screen data from the server 2 is received, the communication terminal 4 composes the search condition input screen 110 using the received WEB screen data and displays the search condition input screen 110 as shown in FIG. 20. The worker inputs a desired search condition item (vehicle maker name, vehicle name, etc.) on the search condition input screen 110.

When the worker presses the "Search" button 109a after inputting a search condition, the communication terminal 4 transmits an operation signal to the server 2 indicating that the worker pressed the "Search" button 110. When the operation signal transmitted from the communication terminal 4 is received, the server 2 searches the repair support DB server 7 for similar cases matching the search condition inputted by the worker, then transmits WEB screen data including the search results to the communication terminal 4. When the WEB screen data transmitted from the server 2 is received, the communication terminal 4 composes, using the received WEB screen data, a similar case list screen 111 which corresponds to the search condition input screen 110 showing, as the search results, a list of similar cases and a list of main-cause parts. By viewing the similar case list screen 111, the worker can grasp the similar cases matching the search conditions and the main-cause parts. Namely, by referring to the list of similar cases and grasping the main-cause parts, the worker can quickly determine the cause of the existing trouble and save the steps otherwise required to be taken to determine the cause of the trouble. In this way, the time and steps to be taken to repair the vehicle can be greatly reduced.

Subsequently, when the worker selects a similar case on the similar case list screen 111, the communication terminal 4 transmits an operation signal to the server 2 indicating the similar case selected by the worker. When the operation signal transmitted from the communication terminal 4 is received, the server 2 transmits, to the communication terminal 4, the WEB screen data to compose a similar case details screen 112 which shows details of the similar case selected by the worker. When the WEB screen data transmitted from the server 2 is received, the communication terminal 4 composes, using the received WEB screen data, the similar case details screen 112 and displays the similar case details screen 112 as shown in FIG. 22. By viewing the similar case details screen 112, the worker can grasp details of the selected similar case.

Figure 23:
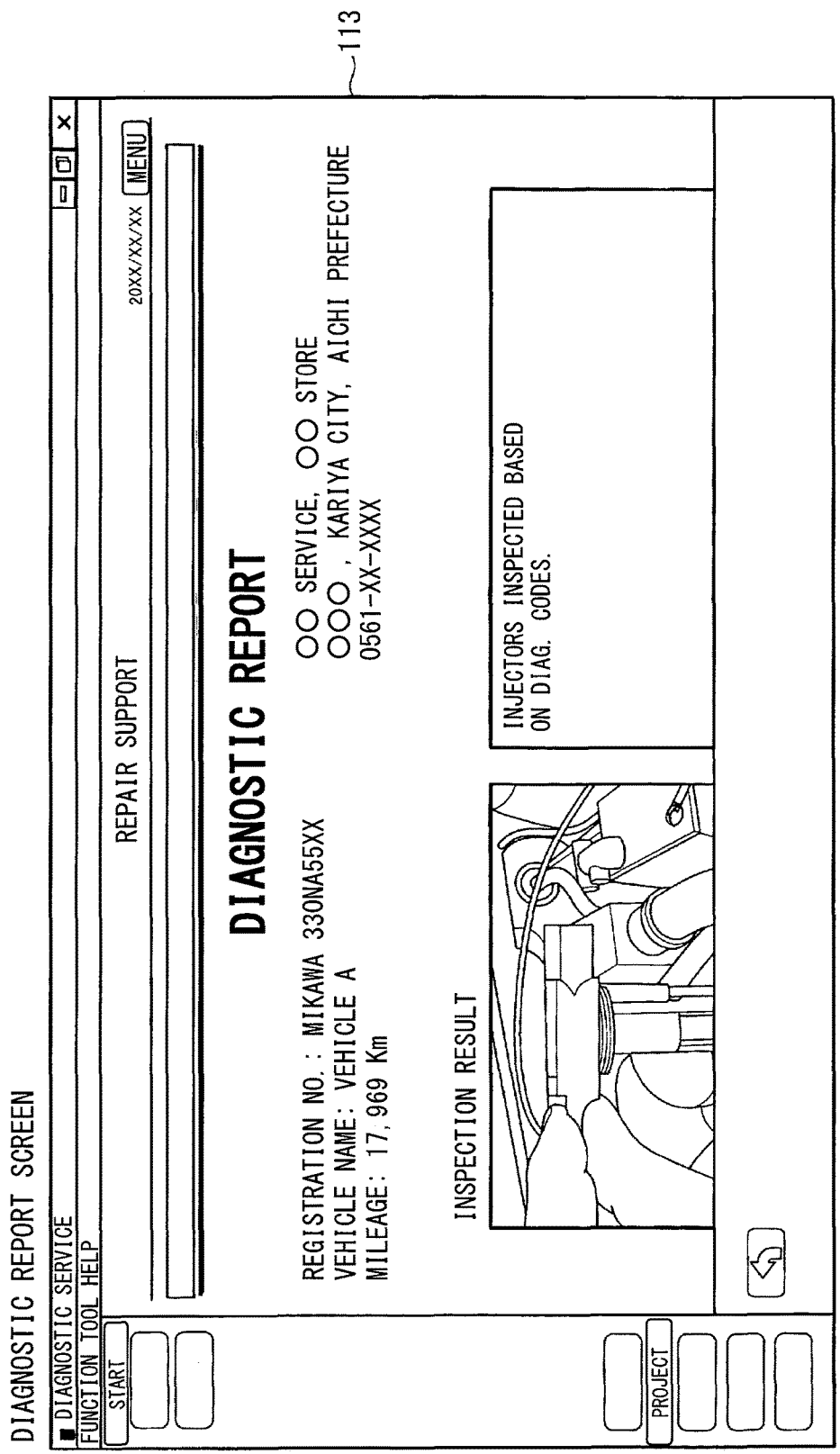
FIG. 23 illustrates a diagnostic report screen.
Figure 25:
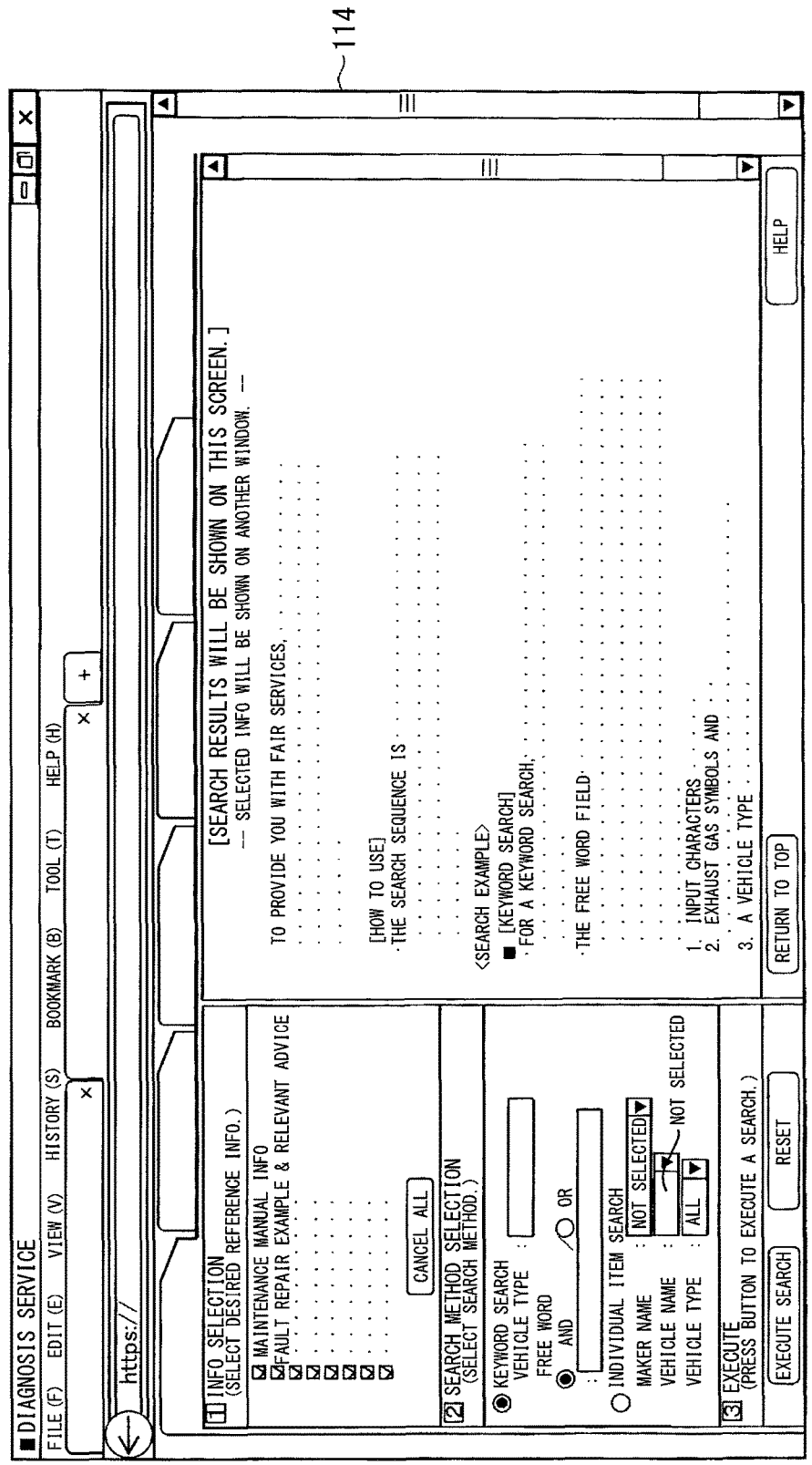
FIG. 25 illustrates a screen linked with another vehicle-repair support system.

Subsequently, when the worker selects a diagnostic report output, the communication terminal 4 transmits an operation signal to the server 2 indicating that the worker selected output of a diagnostic report. When the operation signal transmitted from the communication terminal 4 is received, the server 2 transmits the WEB screen data to compose a diagnostic report screen 113 to the communication terminal 4. When the WEB screen data transmitted from the server 2 is received, the communication terminal 4 composes, using the received WEB screen data, the diagnostic report screen 113 and displays the diagnostic report screen 113 as shown in FIG. 23. By viewing the diagnostic report screen 113, the worker can check the diagnostic report on the selected similar case. It is also possible, at the communication terminal 4, to print out the diagnostic report on paper 201 of a predetermined size as shown in FIG. 24. Also, by statistically analyzing the data about the past similar cases and main-cause parts stored in the repair support DB server 7, the server 2 can change the numbers of similar cases and main-cause parts shown on the similar case list screen 111 and the orders in which they are shown on the screen. Furthermore, when the worker presses a predetermined button 202 on the similar case list screen, the communication terminal 4 displays a screen linked with another vehicle-repair support system as shown in FIG. 25.

As described above, in the vehicle-repair support system 1 according to the first embodiment, the server 2 gives an inquiry to and diagnoses a vehicle 9 to be repaired, through providing via the Internet 5, the communication terminal 4 with an inquiry screen 104 for the worker to answer the inquiry and a series of diagnosis screens 105 to 109 for diagnosing the vehicle 9 worker Based on the results of the inquiry and diagnosis conducted in this way, the server 2 searches for similar cases where vehicles showed trouble symptoms similar to the symptom shown by the vehicle 9 to be repaired and provides the communication terminal 4 with information about such similar cases. In this way, the worker can carry out repair referring to the information about similar cases informed from the server 2 to the communication terminal 4. This reduces the burden on the worker and allows the worker to repair the vehicle 9 in an appropriate manner. With information about similar cases managed in the server 2, many unspecified number of workers can share repair procedures, so that differences in repair work caused by differences in technical level among different workers can be reduced. Hence, a certain level of repair work can be maintained without being affected by differences in technical level among workers.

Also, WEB screens including instructions to the worker to answer inquiries about the vehicle 9 and diagnose the vehicle 9 are provided from the server 2 to the communication terminal 4 via the Internet 5. Therefore, the worker operating the communication terminal 4 can grasp the instructions given to him/her by viewing the WEB screen displayed at the communication terminal 4 and can answer inquiries about the vehicle 9 and diagnose the vehicle 9 following the instructions. Therefore, even in cases where complicated instructions for plural procedures, which causes the condition of the vehicle to vary moment to moment, are involved, the server 2 can appropriately give, by correspondingly updating the WEB screen, such complicated instructions to the worker.

Also, because WEB screens are used to give instructions to the worker, the communication terminal 4 requires no large-capacity storage unit and no complicated software maintenance, so that the burden on the communication terminal 4 can be prevented from increasing. Also, it is possible to generate WEB screens corresponding to widely varying characteristics (e.g., vehicle type, engine type, drive system (2WD/4WD), and transmission type) of the vehicle 9 without requiring plural communication terminals 4 to be prepared for different characteristics of the vehicle 9 to be diagnosed. Since the communication terminal 4 is only required to be capable of displaying the WEB screens (WEB browser function), a general-purpose communication terminal 4 can be made use of. This makes realization of a communication terminal 4 easy.

Second Embodiment

Figure 26:
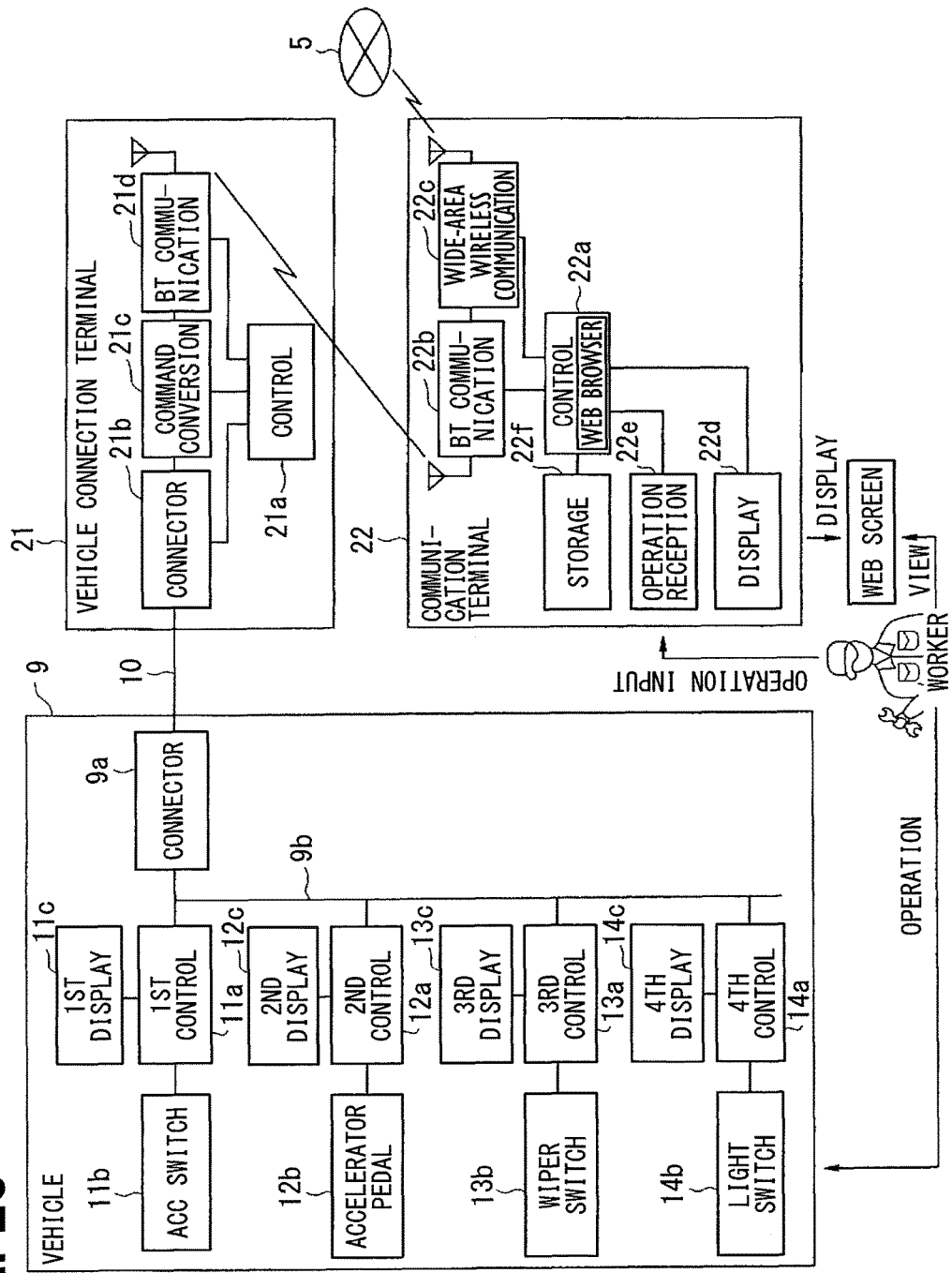
FIG. 26 is an outline configuration diagram illustrating a second embodiment.

Next, a second embodiment will be described with reference to FIG. 26. In the configuration of the first embodiment, the communication terminal 4 is directly connected to a vehicle, and the communication terminal 4 obtains vehicle information directly from the vehicle. The second embodiment has a configuration in which a communication terminal is connected to a vehicle via a dedicated vehicle connection terminal, and the communication terminal 4 obtains vehicle information from the vehicle via the vehicle connection terminal.

A vehicle connection terminal 21 includes a controller 21a to control overall operations, a connector 21b, a command conversion unit 21c, and a BT communication unit 21d to conduct Bluetooth (registered trademark) communication with a communication terminal 22 The connector 21b and the command conversion unit 21c correspond to the connector 4b and the command conversion unit 4d described in the foregoing concerning the first embodiment. The communication terminal 22 includes a controller 22a to control overall operations, a BT communication unit 22b to conduct Bluetooth (registered trademark) communication with the vehicle connection terminal 21, and a wide-range wireless communication unit 22c, a display unit 22d, an operation acceptance unit 22e, and a storage unit 22f. The wide-range wireless communication unit 22c, the display unit 22d, the operation acceptance unit 22e, and the storage unit 22f correspond to the wide-range wireless communication unit 4c, the display unit 4e, the operation acceptance unit 4f, and the storage unit 4g described in the foregoing concerning the first embodiment. The vehicle connection terminal 21 and the communication terminal 22 need not necessarily be connected via Bluetooth, and they may be connected via an alternative wireless communication system (e.g., a wireless LAN). Also, the vehicle connection terminal 21 and the communication terminal 22 may be wiredly connected to each other. In this configuration in which the functions of the communication terminal 4 described concerning the first embodiment are distributed between the two terminals, i.e. the vehicle connection terminal 21 and the communication terminal 22, technical effects similar to those obtained in the first embodiment can also be obtained.

Third Embodiment

Next, a third embodiment will be described with reference to FIGS. 27 to 38. In the third embodiment, when the worker gives the inquiry to a client requesting vehicle repair, the inquiry items include an inquiry as to whether or not the repair to be made is attributable to an accident or disaster.

Namely, when the worker selects the "Inquiry" tab, the communication terminal 4 displays an inquiry screen 121 as shown in FIG. 27. On the inquiry screen 121, the worker answers an inquiry as to whether or not the repair is attributable to an accident or disaster by selecting either "Yes" button 121a or "No" button 121b. Namely, when the repair is attributable to an accident or disaster, the worker selects the "Yes" button and, when the repair is not attributable to an accident nor disaster (e.g., has become necessary due to a failure caused by aging), the worker selects the "No" button 121b.

When, after selecting the "Yes" button 121a or "No" button 121b on the inquiry screen 121, the worker selects the pull-down icon 121c in the input field 121c for entering a product category, the communication terminal 4 displays a list of candidate product category items as shown in FIG. 28. When the worker selects an item in the list, the communication terminal 4 enters the selected item in the input field 121c. In the example shown in FIG. 28, "Gasoline engine" selected by the worker is entered in the input field 121c.

Figure 31:
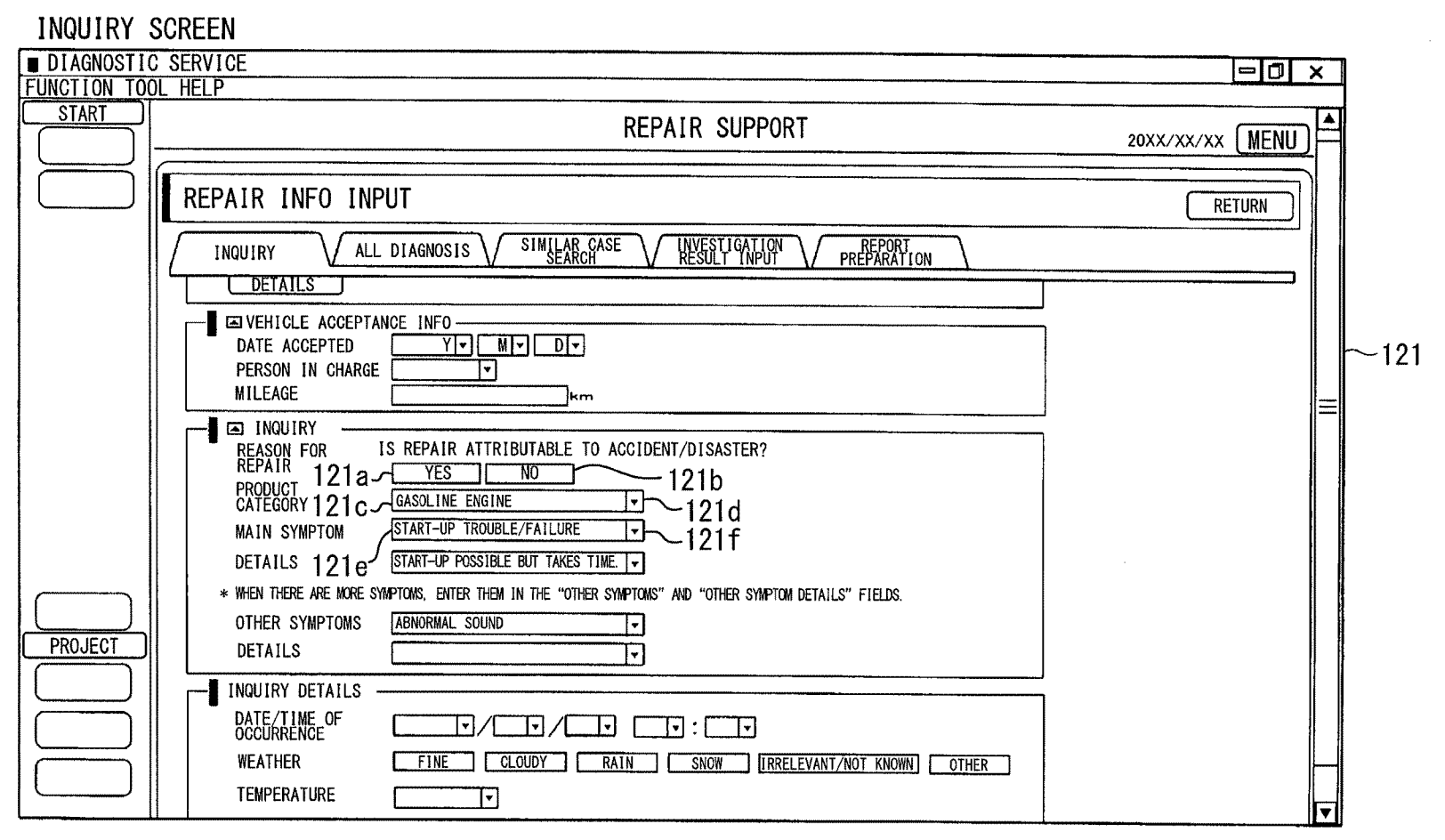
Figure 32:
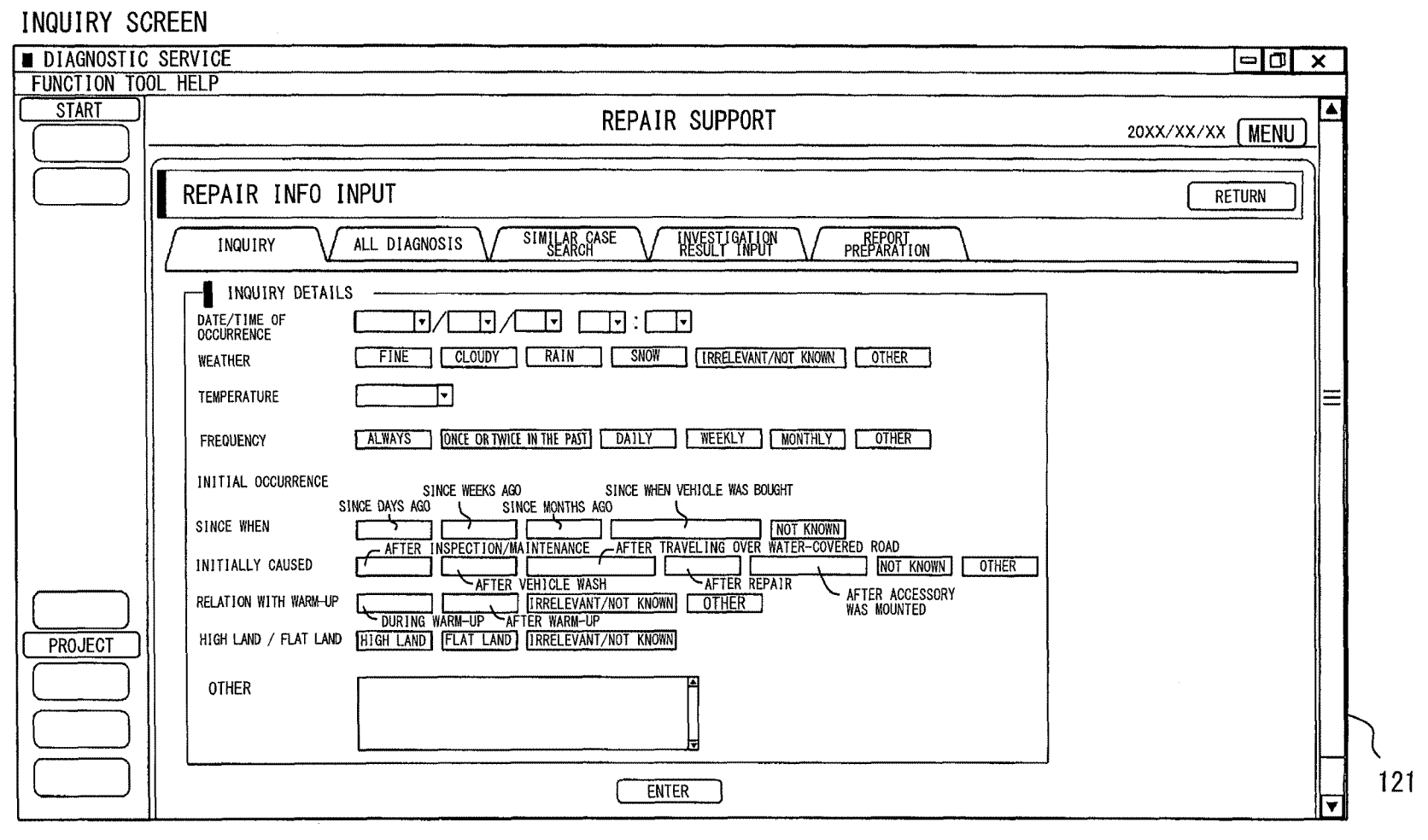

Subsequently, the communication terminal 4 displays, as shown in FIG. 29, an input field 121e for a next item to be entered, i.e. symptoms (main and other symptoms). In this case, too, when the worker selects the pull-down icon 121f in the input field 121e for entering a main symptom, the communication terminal 4 shows a list of candidate main symptom items as shown in FIG. 30. When the worker selects an item from the list, the communication terminal 4 enters the selected symptom item in the main symptom input field 121e. In the example shown in FIG. 30, "Startup trouble/failure" selected by the worker is entered in the main symptom input field 121e. In this manner, the communication terminal 4 repeats the process to enter other items selected by the worker as shown in FIG. 31. In the example shown in FIG. 31, the worker has selected "Start-up possible but takes time" as details of a main symptom and "Abnormal noise" as another symptom. When the worker scrolls down the inquiry screen 121, the communication terminal 4 displays a screen on which the worker is to answer subsequent detailed questions as shown in FIG. 32.

Figure 33:
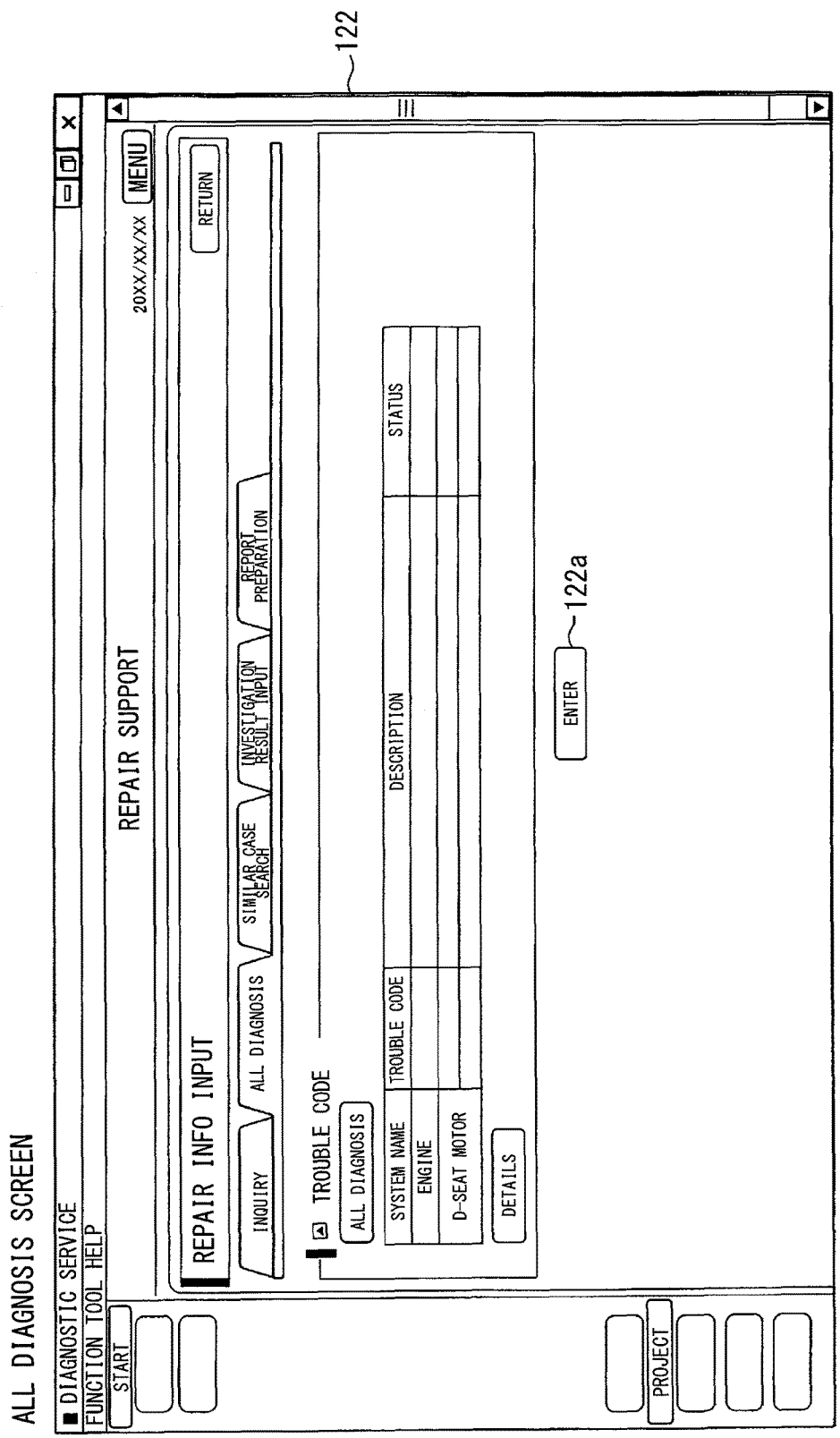
FIG. 33 illustrates an all diagnosis screen.

Subsequently, when the worker selects the "All diagnosis" tab, the communication terminal 4 displays an all diagnosis screen 122 as shown in FIG. 33. When the worker selects the "Enter" button 122a on the all diagnosis screen 122, the communication terminal transmits to the server 2 the diagnostic information obtained from the vehicle 9.

Figure 34:
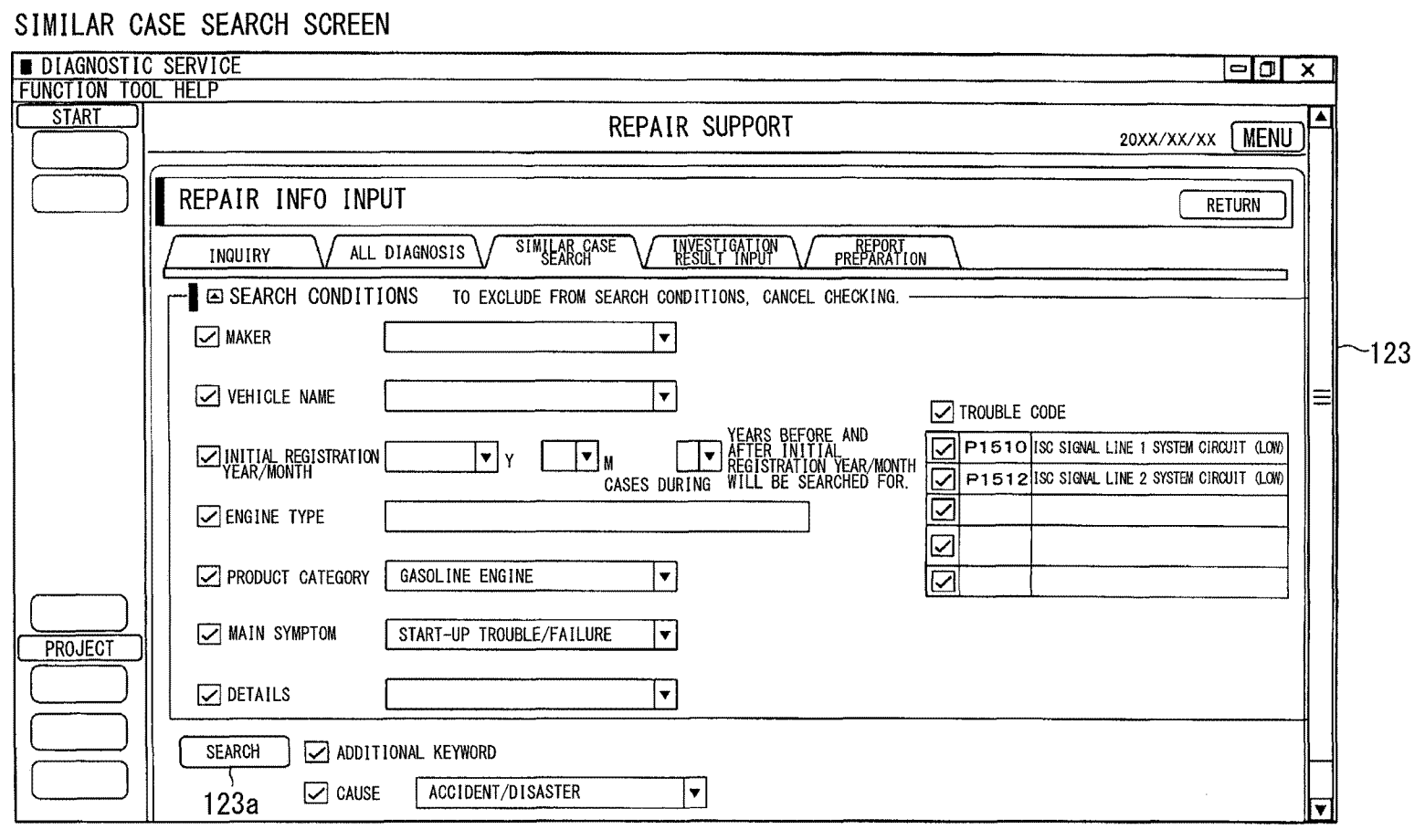

Subsequently, when the worker selects the "Similar case search" tab, the communication terminal 4 displays a similar case search screen 123 as shown in FIG. 34. On the similar case search screen 123, items such as the maker name, vehicle name, product category, and main symptom inputted on the inquiry screen 121 are already entered. The diagnostic information (trouble codes) obtained from the vehicle 9 by selecting the "Enter" button 122a on the all diagnosis screen 122 is also already entered on the similar case search screen 123. Furthermore, since the worker indicated (selected the "Yes" button 121a) on the inquiry screen 121 that the repair to be made was attributable to an accident or disaster, "Accident/disaster" is entered in the cause field. In this case, the respective items are each provided with a check box. When the check box provided for an item is checked, the item is applied as a search condition. When the check box is not checked, the item is not applied as a search condition. Namely, when the worker cancels checking of an item, the selection of the item as a search condition is canceled, so that the worker can collect information about more similar cases. On the other hand, when the worker checks an unchecked item, the item is applied as an additional search condition, so that the worker can collect information about similar cases showing high similarity. In an initial state, all items are checked.

When the worker selects the "Search" button 123a on the similar case search screen 123, the communication terminal 4 transmits an operation signal to the server 2. When the operation signal transmitted from the communication terminal 4 is received, the sever 2 searches the repair support DB server 7 for similar cases matching the search conditions inputted by the worker and transmits the WEB screen data including the search results to the communication terminal 4. When the WEB screen data from the server 2 is received, the communication terminal 4 composes, using the received WEB screen data, the similar case search screen and displays the similar case search screen listing the similar cases found by the foregoing search as shown in FIG. 35. In the present embodiment, because the input as to whether or not the repair to be made is attributable to an accident or disaster is made it is possible to separately collect information about similar cases of repairs attributable to an accident or disaster and information about similar cases of repairs not attributable to an accident nor disaster (e.g., repairs made to remove malfunction resulting from aging). Generally, the contents of repair to be made differ between when the repair is attributable to an accident or disaster and when the repair is not attributable to an accident nor disaster. Therefore, by searching for similar cases separately for different cases as described above, information about similar cases more helpful for a specific case (more helpful for a specific repair to be made) can be obtained.

Figure 36:
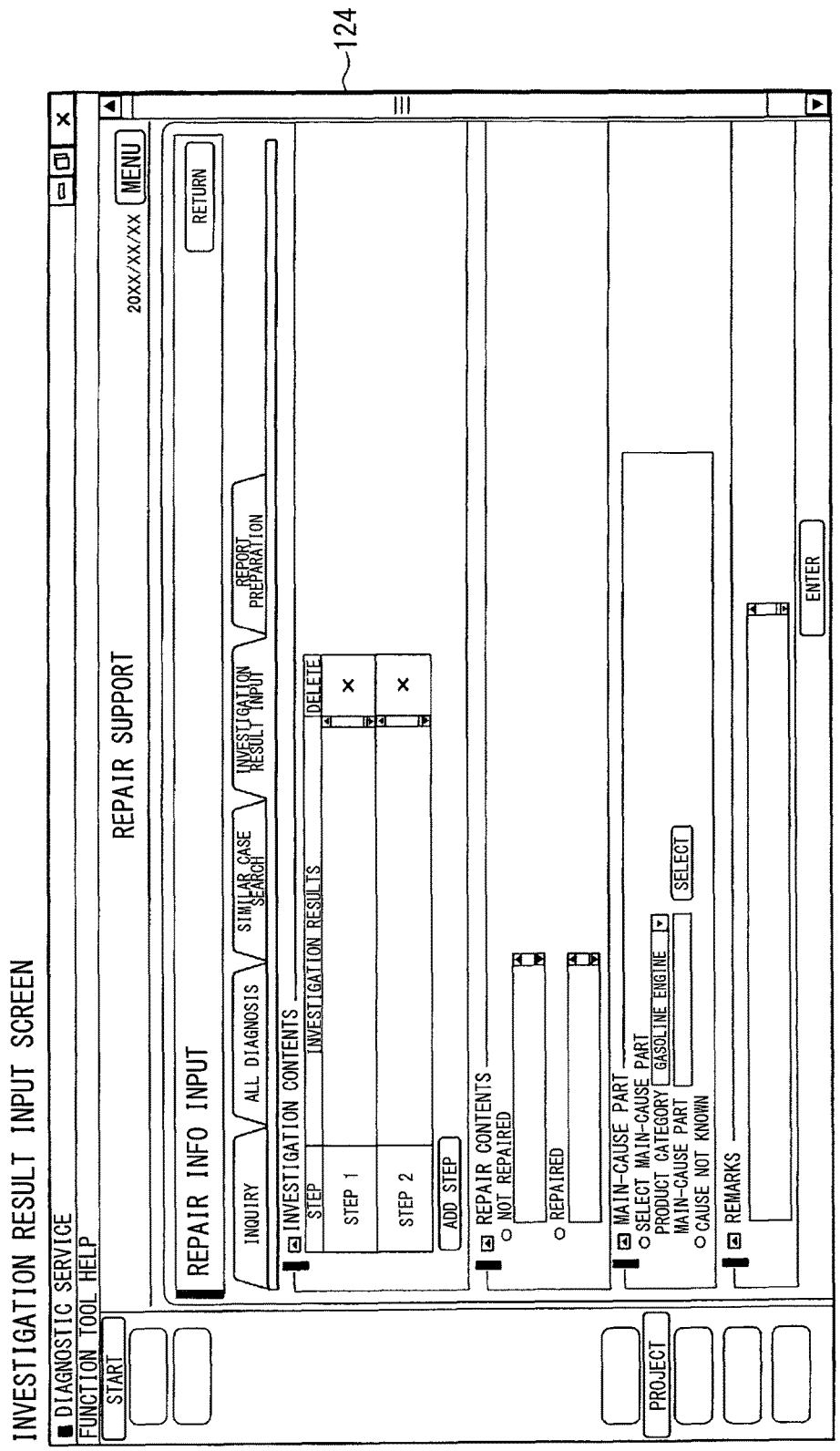
FIG. 36 illustrates an investigation result input screen.

Subsequently, when the worker selects the "Investigation result input" tab, the communication terminal 4 displays an investigation result input screen 124 as shown in FIG. 36. When, on the investigation result input screen 124, the worker enters relevant information in the fields of the investigation contents, repair contents, main-cause part, and remarks, respectively, the communication terminal 4 transmits the respective information to the server 2. Subsequently, when the worker selects the "Report preparation" tab, the communication terminal 4 displays a report preparation screen 125 as shown in FIG. 37. When, on the report preparation screen 125, the worker selects items to be printed and enters an instruction for printing, the communication terminal 4 outputs a report with the selected items printed thereon.

Figure 38:
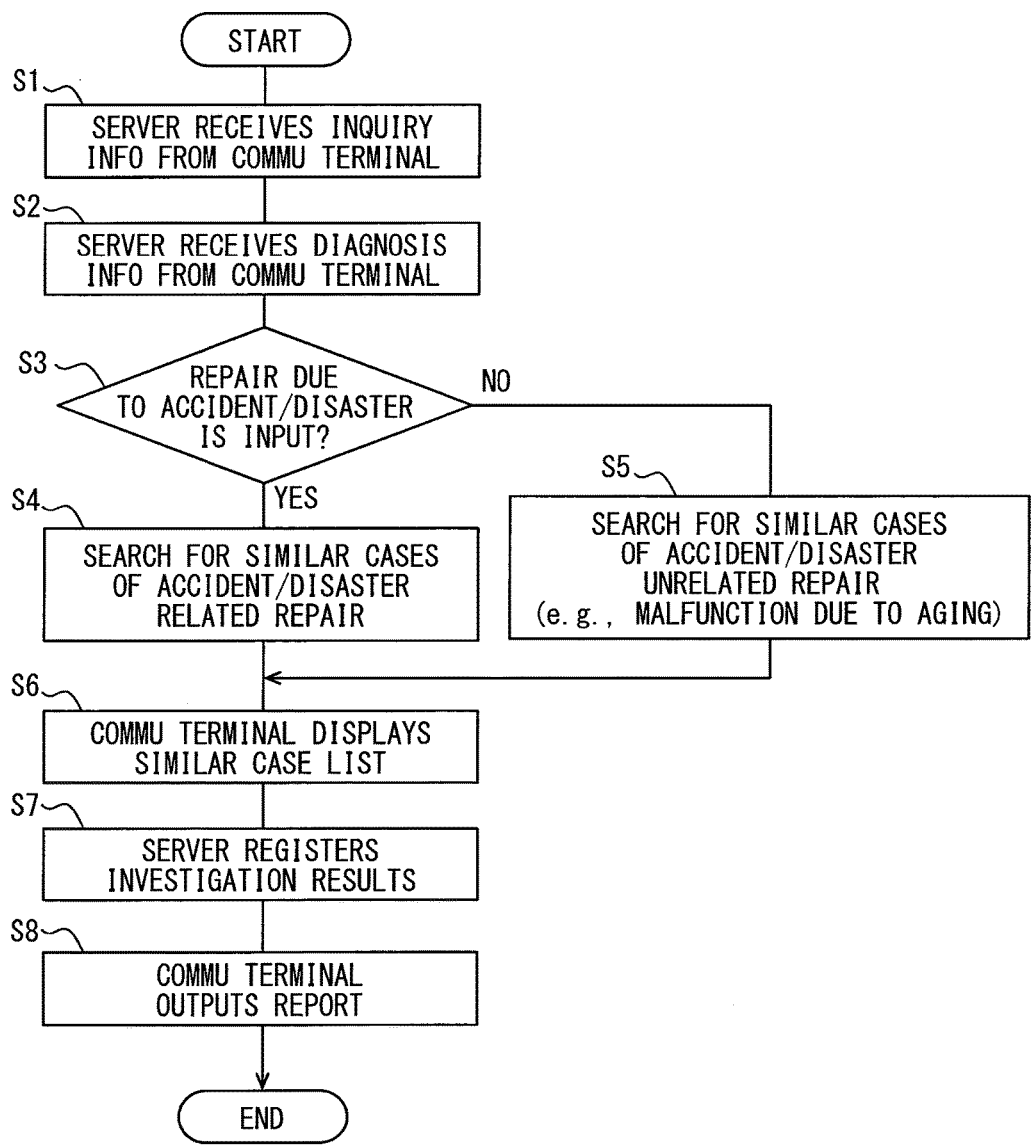
FIG. 38 is a flowchart.

FIG. 38 shows a flow of the above-described series of processing. The server 2 receives the inquiry information, which is inputted by the worker on the inquiry screen 121, from the communication terminal 4 (S1), and also receives from the communication terminal 4 the diagnostic information which is collected from the vehicle 9 by the communication terminal 4 (S2). When, on the similar case search screen 123, the worker enters an instruction to search for similar cases, the server 2 searches the repair support DB server 7 for similar cases matching the search conditions inputted by the worker (S3 to S5). In this case, the input as to whether or not the repair to be made is attributable to an accident or disaster has been made by the worker on the inquiry screen 121. Therefore, the server 2 searches either for similar cases of repairs attributable to an accident or disaster or for similar cases of repairs not attributable to an accident nor disaster (e.g., repairs made to remove malfunction resulting from aging). The server 2 transmits a list of similar cases found by searching made this time to the communication terminal 4. When the list of similar cases is received from the server 2, the communication terminal 4 displays the received list of similar cases (S6).

In the above series of processing, when the repair to be made is attributable to an accident or disaster, the worker can enter this repair attribution on the inquiry screen 121 and can obtain a list of similar cases of repairs attributable to an accident or disaster. On the other hand, when the repair to be made is attributable to other than an accident and disaster, the worker can enter this repair attribution on the inquiry screen 121 and can obtain a list of similar cases not attributable to an accident or disaster.

Subsequently, when, on the investigation result input screen 124, the worker enters relevant information in the fields of the investigation contents, repair contents, main-cause part, and remarks, respectively, the server 2 registers the information received from the communication terminal 4 (S7). When, on the report preparation screen 125, the worker selects items to be printed and enters an instruction for printing, the communication terminal 4 outputs a report with the selected items printed thereon (S8).

As described above, according to the third embodiment, the inquiry items include an item as to whether or not the repair to be made is attributable to an accident or disaster, and searching is made separately for similar cases of repairs attributable to an accident or disaster and for similar cases of repairs not attributable to an accident nor disaster (e.g., repairs made to remove malfunction resulting from aging). Therefore, it is possible to obtain a list of only such similar cases of repairs attributable to an accident or disaster or a list of only such cases of repairs not attributable to an accident or disaster. This makes it possible to search for similar cases with high accuracy to realize more appropriate repair support. Also, by limiting the similar cases to be searched for, the time required to obtain information about appropriate similar cases can be reduced, and the time taken before repair work is started can also be reduced. Also, an inquiry is made to proceed from a major inquiry item (a product category item) toward a minor inquiry item (a symptom item corresponding to the product category). In this way, the worker can input setting information proceeding along a tree structure, so that the operability in setting search conditions can be improved.

Other Embodiments

The embodiments of the present disclosure are not limited to the foregoing embodiments and include modified and expanded embodiments as described below.

The application of the present disclosure is not limited to engine diagnosis. The present disclosure may also be applied to diagnosing of other mechanisms, for example, car air-conditioners.

Diagnosing an engine need not necessarily follow a series of processing including diagnosis, start-up, idling, racing, and full-open racing. For example, the processing may be divided such that, for example, only diagnosis, only a start-up, or only idling is executed. Or, a combination of two or more operations, for example, a start-up and idling, may be executed.

The instructions given to a worker using the WEB screen need not be composed of characters only. They may also include images in combination, and may use still or moving images. For example, instructions may include images accompanied by sound. Instructions including images may be effective in conveying the instructions to the worker more accurately.

In the vehicle 9, the connector 9a need not necessarily be connected via a CAN to the first to fourth controllers 11a to 14a. They may be connected using an alternative communication system, for example, an in-vehicle Ethernet (registered trade mark) or Flexray (registered trademark).

The search condition to be applied when searching for similar cases needs not include both an inquiry result and a diagnosis result. A search condition including an inquiry result only may be applied in searching for similar cases.

The embodiments and configurations of the present disclosure are not limited to the foregoing embodiments and configurations, and can be modified in various ways. Parts of the foregoing embodiments and configurations, and embodiments and configurations obtained by appropriately combining technical parts disclosed in different embodiments and configurations are also included in the embodiments and configurations of the present disclosure.

What is claimed is:

1. A vehicle-repair support system, comprising:
   a communication terminal that obtains vehicle information from a vehicle; and
   a server that receives the vehicle information from the communication terminal and supports a repair of the vehicle,
   wherein the server comprises a controller configured to:
   make an inquiry to a repair requester about a vehicle condition;
   based on a result of the inquiry, make a search for information about similar cases which involve a symptom similar to a symptom of the vehicle targeted for the repair; and
   notify a result of the search made to the communication terminal,
   and wherein
   the controller transmits screen data to the communication terminal to make the inquiry about an inquiry item as to whether or not the repair is attributable to an accident or disaster, and
   based on a result of the inquiry as to whether or not the repair is attributable to an accident or disaster, the controller makes the search for the information about the similar cases which involve the symptom similar to the symptom of the vehicle targeted for the repair, a first communication path in which the server acquires the vehicle information from the communication terminal is different from a second communication path in which the server transmits the screen data to the communication terminal, and
   wherein the controller is further configured to transmit instruction screen data to the communication terminal, the instruction screen data configuring the communication terminal to display an instruction to start an engine of the vehicle upon completion of a countdown, a timing for the completion of the countdown being synchronized with when the controller will be ready to receive data related to starting the engine from the communication terminal.

2. The vehicle-repair support system according to claim 1, wherein
   the controller makes the inquiry about inquiry items proceeding from a major inquiry item toward a minor inquiry item.

3. The vehicle-repair support system according to claim 2, wherein
   the controller makes the inquiry about an inquiry item concerning product category and then makes the inquiry about an inquiry item concerning a symptom corresponding to the product category.

4. The vehicle-repair support system according to claim 1, wherein the screen data additionally includes an inquiry item configuring the communication terminal to display and receive a selection of a product category for the repair.

5. The vehicle-repair support system according to claim 4, wherein the selection of the product category for the repair includes at least one of a gasoline engine, a diesel engine, a battery/charger, a transmission, a chassis, a body, an air-conditioner, and an info/AV device.

6. The vehicle-repair support system according to claim 1, wherein
   the controller notifies a list of the similar cases to the communication terminal as the result of the search.

7. The vehicle-repair support system according to claim 6, wherein
   the controller notifies details of one of the similar cases in the list to the communication terminal as the result of the search.

8. The vehicle-repair support system according to claim 1, wherein
   the controller notifies, as the result of the search, the communication terminal of a main-cause part causing a trouble that is to be repaired.

9. The vehicle-repair support system according to claim 8, wherein
   the server includes a storage controller that stores at least one of the result of the inquiry made by the controller, the information about the similar cases, and the information about the main-cause part.

10. The vehicle-repair support system according to claim 9, wherein
    the controller statistically analyzes at least one of the information about the similar cases and the information about the main-cause part both stored by the storage controller.

11. The vehicle-repair support system according to claim 10, wherein
    the controller can change a manner of notifying the result of the search made by the controller to the communication terminal according to a result of analysis made by the controller.

12. The vehicle-repair support system according to claim 1, wherein
the controller performs linkage with another vehicle-repair support system.

13. The vehicle-repair support system according to claim 1, wherein
the controller provides the result of the search so that the communication terminal can display the result of the search via a communication network.

14. A vehicle-repair support system, comprising:
a communication terminal that obtains vehicle information from a vehicle; and
a server that receives the vehicle information from the communication terminal and supports a repair of the vehicle,
wherein the server comprises a controller configured to:
make an inquiry to a repair requester about a vehicle condition;
based on a result of the inquiry, make a search for information about similar cases which involve a symptom similar to a symptom of the vehicle targeted for the repair;
notify a result of the search to the communication terminal; and
make a diagnosis of the vehicle by analyzing the vehicle information obtained from the vehicle,
wherein
the controller transmits screen data to the communication terminal to make the inquiry about an inquiry item as to whether or not the repair is attributable to an accident or disaster,
based on the result of the inquiry and a result of the diagnosis, the controller makes the search for information about the similar cases which involve the symptom similar to the symptom of the vehicle targeted for the repair,
a first communication path in which the server acquires the vehicle information from the communication terminal is different from a second communication path in which the server transmits the screen data to the communication terminal, and
wherein the controller is further configured to transmit instruction screen data to the communication terminal, the instruction screen data configuring the communication terminal to display an instruction to start an engine of the vehicle upon completion of a countdown, a timing for the completion of the countdown being synchronized with when the controller will be ready to receive data related to starting the engine from the communication terminal.

15. A server constituting a vehicle-repair support system in cooperation with a communication terminal that obtains vehicle information from a vehicle, wherein the server receives the vehicle information from the communication terminal and supports a repair of the vehicle,
the server comprising a controller configured to:
make an inquiry to a repair requester about vehicle condition;
based on a result of the inquiry, make a search for information about similar cases which involve a symptom similar to a symptom of the vehicle targeted for the repair;
notify a result of the search to the communication terminal; and
transmit screen data to the communication terminal to make the inquiry about an inquiry item as to whether or not the repair is attributable to an accident or disaster,
wherein
based on a result of the inquiry as to whether or not the repair is attributable to an accident or disaster, the controller makes the search for the information about the similar cases which involve the symptom similar to the symptom of the vehicle targeted for the repair,
a first communication path in which the server acquires the vehicle information from the communication terminal is different from a second communication path in which the server transmits the screen data to the communication terminal, and
wherein the controller is further configured to transmit instruction screen data to the communication terminal, the instruction screen data configuring the communication terminal to display an instruction to start an engine of the vehicle upon completion of a countdown, a timing for the completion of the countdown being synchronized with when the controller will be ready to receive data related to starting the engine from the communication terminal.

16. A server constituting a vehicle-repair support system in cooperation with a communication terminal that obtains vehicle information from a vehicle, wherein the server receives the vehicle information from the communication terminal and supports repair of the vehicle,
the server comprising a controller configured to:
make an inquiry to a repair requester about vehicle condition;
based on a result of the inquiry make a search for information about similar cases which involve a symptom similar to a symptom of the vehicle targeted for the repair;
notify a result of the search made by the controller to the communication terminal; and
make a diagnosis of the vehicle by analyzing the vehicle information obtained from the vehicle,
wherein
based on the result of the inquiry and a result of the diagnosis, the controller searches for the information about the similar cases which involve the symptom similar to the symptom of the vehicle targeted for the repair, and
wherein the controller is further configured to transmit instruction screen data to the communication terminal, the instruction screen data configuring the communication terminal to display an instruction to start an engine of the vehicle upon completion of a countdown, a timing for the completion of the countdown being synchronized with when the controller will be ready to receive data related to starting the engine from the communication terminal.

17. A non-transitory computer-readable storage medium storing a computer program that causes a computer provided in a server, which constitutes a vehicle-repair support system in cooperation with a communication terminal that obtains vehicle information from a vehicle and which receives the vehicle information from the communication terminal to support repair of the vehicle, to execute:
making an inquiry to a repair requester about vehicle condition;
based on a result of the inquiry, making a search for information about similar cases which involve a symptom similar to a symptom of the vehicle targeted for the repair; and
notifying the communication terminal of a result of the search,
wherein the computer transmits screen data to the communication terminal to make the inquiry about an inquiry item as to whether or not the repair is attributable to an accident or disaster, the inquiry is made about an inquiry item as to whether or not the repair is attributable to an accident or disaster, based on a result of the inquiry as to whether or not the repair is attributable to an accident or disaster, the search for the information about the similar cases which involve the symptom similar to the symptom of the vehicle targeted for the repair is made, a first communication path in which the server acquires the vehicle information from the communication terminal is different from a second communication path in which the server transmits the screen data to the communication terminal, and wherein the computer program further causes the computer provided in the server to transmit instruction screen data to the communication terminal, the instruction screen data configuring the communication terminal to display an instruction to start an engine of the vehicle upon completion of a countdown, a timing for the completion of the countdown being synchronized with when the computer will be ready to receive data related to starting the engine from the communication terminal.

18. A non-transitory computer-readable storage medium storing a computer program that causes a computer provided in a server, which constitutes a vehicle-repair support system in cooperation with a communication terminal that obtains vehicle information from a vehicle and which receives the vehicle information from the communication terminal to support repair of the vehicle, to execute:

making an inquiry to a repair requester about vehicle condition;

based on a result of the inquiry, making a search for information about similar cases which involve a symptom similar to a symptom of the vehicle targeted for the repair;

notifying the communication terminal of a result of the search; and making a diagnosis of the vehicle using the vehicle information obtained from the vehicle, wherein the computer transmits screen data to the communication terminal to make the inquiry about an inquiry item as to whether or not the repair is attributable to an accident or disaster, based on the result of the inquiry and a result of the diagnosis, the search for the information about the similar cases which involve the symptom similar to the symptom of the vehicle targeted for the repair is made, a first communication path in which the server acquires the vehicle information from the communication terminal is different from a second communication path in which the server transmits the screen data to the communication terminal, and wherein the computer program further causes the computer provided in the server to transmit instruction screen data to the communication terminal, the instruction screen data configuring the communication terminal to display an instruction to start an engine of the vehicle upon completion of a countdown, a timing for the completion of the countdown being synchronized with when the computer will be ready to receive data related to starting the engine from the communication terminal.

* * * * *